United States Patent
Nakatsukasa et al.

(10) Patent No.: US 11,528,204 B2
(45) Date of Patent: Dec. 13, 2022

(54) MONITORING DEVICE, NETWORK FAULT MONITORING SYSTEM, AND MONITORING METHOD

(71) Applicant: Nippon Telegraph and Telephone Corporation, Tokyo (JP)

(72) Inventors: Satoshi Nakatsukasa, Musashino (JP); Masatoshi Saito, Musashino (JP); Ken Takahashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 105 days.

(21) Appl. No.: 16/970,678

(22) PCT Filed: Feb. 18, 2019

(86) PCT No.: PCT/JP2019/005920
§ 371 (c)(1),
(2) Date: Aug. 18, 2020

(87) PCT Pub. No.: WO2019/163725
PCT Pub. Date: Aug. 29, 2019

(65) Prior Publication Data
US 2020/0382393 A1    Dec. 3, 2020

(30) Foreign Application Priority Data
Feb. 20, 2018   (JP) .............................. JP2018-028316

(51) Int. Cl.
*H04L 43/0811* (2022.01)
*G06F 16/22* (2019.01)
(Continued)

(52) U.S. Cl.
CPC ...... *H04L 43/0811* (2013.01); *G06F 16/2282* (2019.01); *G06F 16/24578* (2019.01);
(Continued)

(58) Field of Classification Search
None
See application file for complete search history.

(56) References Cited

U.S. PATENT DOCUMENTS

2010/0265831 A1* 10/2010 Hachiya .............. H04L 49/3009
                                                           370/248
2014/0040476 A1*  2/2014 Ishida .................... H04L 45/64
                                                           709/226
(Continued)

FOREIGN PATENT DOCUMENTS

JP   2010-88031   4/2010
JP   5424349      2/2014

OTHER PUBLICATIONS

Claise, "Cisco Systems NetFlow Services Export Version 9," Network Working Group, Oct. 2004, 34 pages.

*Primary Examiner* — Dhairya A Patel
*Assistant Examiner* — Eui H Kim
(74) *Attorney, Agent, or Firm* — Fish & Richardson P.C.

(57) ABSTRACT

A network 50 is hierarchically divided into network devices 501 to 506, areas, and the like to be monitoring targets, and a monitoring device 100 monitors a divided monitoring target. A monitoring device of an N-th layer (here, N≥2) that is an upper layer with respect to a first layer monitors information of reachability between user connection points received from a monitoring device of an (N−1)-th layer that is a lower layer and network devices connecting monitoring targets of the (N−1)-th layer making up monitoring targets of the N-th layer and connection statuses between the network devices and areas that are monitoring targets. The monitoring device determines the presence/absence of reachability between user connection points belonging to different monitoring targets of the (N−1)-th layer on the basis of this reachability and the connection statuses.

8 Claims, 13 Drawing Sheets

(51) Int. Cl.
　　　*G06F 16/2457*　　(2019.01)
　　　*H04L 41/0654*　　(2022.01)
　　　*H04L 43/0882*　　(2022.01)
　　　*H04L 43/12*　　　(2022.01)
　　　*H04L 43/16*　　　(2022.01)
　　　*H04L 45/586*　　(2022.01)
　　　*H04L 41/0695*　　(2022.01)

(52) U.S. Cl.
　　　CPC ...... *H04L 41/0654* (2013.01); *H04L 41/0695* (2013.01); *H04L 43/0882* (2013.01); *H04L 43/12* (2013.01); *H04L 43/16* (2013.01); *H04L 45/586* (2013.01)

(56) References Cited

U.S. PATENT DOCUMENTS

2017/0353244 A1* 12/2017 Takeshita ............. H04B 10/275
2019/0075017 A1*  3/2019 Laden .................... H04L 67/10

* cited by examiner

| LAYER | MONITORING TARGET | CONNECTION POINT | HIGHER-RANK CONNECTION POINT |
|---|---|---|---|
| FIRST LAYER | N DEVICE | CONNECTION POINT BETWEEN USER AND VPN | N DEVICE |
| SECOND LAYER | AREA | N DEVICE | N DEVICE CONNECTING AREAS |
| THIRD LAYER | NETWORK | N DEVICE CONNECTING AREAS | NONE |

| | 131 | 132 | 133 | 134 |
|---|---|---|---|---|
| | NODE NO. | VPN | CP | IF NUMBER |
| | N501 | VPN_a | CP1 | IF0/0/1 |
| | N501 | VPN_a | CP2 | IF0/0/2 |
| | N501 | VPN_a | CP3 | IF0/0/3 |
| | N501 | VPN_b | CP1 | IF0/1/1 |
| | N501 | VPN_b | CP2 | IF0/1/2 |

| 141 | 142 | 143 | 144 |
|---|---|---|---|
| NODE NO. | IF NUMBER | CONNECTION DESTINATION | OPERATION |
| N501 | IF0/0/1 | N/A | U→D |
| N501 | IF0/0/2 | N/A | UP |
| N501 | IF0/0/3 | N/A | UP |
| N501 | IF0/1/1 | N/A | UP |
| N501 | IF0/1/2 | N/A | U→D |
| N501 | IF0/1/3 | N/A | DOWN |

| | CP1 | CP2 | CP3 | UPPER CP |
|---|---|---|---|---|
| CP1 | 1 | 0 | 0 | 1→0 |
| CP2 | 0 | 1 | 0 | 1 |
| CP3 | 0 | 0 | 1 | 1 |
| UPPER CP | 1→0 | 1 | 1 | 1 |

| | CP1 | CP2 | UPPER CP |
|---|---|---|---|
| CP1 | 1 | 0 | 1 |
| CP2 | 0 | 1 | 1→0 |
| UPPER CP | 1 | 1→0 | 1 |

| CP | UPPER CP |
|---|---|
| CP1 | N501→null |
| CP2 | N501 |
| CP3 | N501 |

| CP | UPPER CP |
|---|---|
| CP1 | N501 |
| CP2 | N501→null |

Fig. 8A (180A)

| CP PAIR | REACHABILITY |
|---|---|
| CP1-CP2 | OK→NG |
| CP1-CP3 | OK→NG |
| CP2-CP3 | OK |

| CP PAIR | REACHABILITY |
|---|---|
| CP1-CP2 | OK→NG |

Fig. 9

| NODE NO. | IF NUMBER | CONNECTION DESTINATION | OPERATION |
|---|---|---|---|
| N501 | IF1/0/1 | N505 | UP |
| N502 | IF1/0/1 | N505 | UP |
| N505 | IF0/0/1 | N501 | UP |
| N505 | IF0/0/2 | N502 | UP |

| CP | UPPER CP |
|---|---|
| CP1 | N501→null |
| CP2 | N501 |
| CP3 | N501 |
| CP4 | N502 |

| CP | UPPER CP |
|---|---|
| CP1 | N501 |
| CP2 | N501→null |
| CP3 | N502 |

|  | N501 | N502 | N505 |
|---|---|---|---|
| N501 | 1 | 0 | 1 |
| N502 | 0 | 1 | 1 |
| N505 | 1 | 1 | 1 |

Fig. 12A

| CP | UPPER CP | |
|---|---|---|
| CP1 | N501→null | N502→null |
| CP2 | N501 | N502 |
| CP3 | N501 | N502 |
| CP4 | N502 | N502 |

170C; 177 (CP1 row); 178 (CP3 row); 171, 172, 173 columns

Fig. 12B

| CP | UPPER CP | |
|---|---|---|
| CP1 | N501 | N502 |
| CP2 | N501→null | N502→null |
| CP3 | N502 | N502 |

| CP PAIR | REACHABILITY |
|---|---|
| CP1-CP4 | OK→NG |
| CP2-CP4 | OK |
| CP3-CP4 | OK |

| CP PAIR | REACHABILITY |
|---|---|
| CP1-CP3 | OK |
| CP2-CP3 | OK→NG |

180D

| NODE NO. | IF NUMBER | CONNECTION DESTINATION | OPERATION |
|---|---|---|---|
| N502 | IF1/1/1 | N503 | UP |
| N503 | IF1/1/1 | N502 | UP |

| CP | UPPER CP | |
|---|---|---|
| CP1 | N501→null | N502→null |
| CP2 | N501 | N502 |
| CP3 | N501 | N502 |
| CP4 | N502 | N502 |
| CP5 | N504 | N503 |

| CP | UPPER CP | |
|---|---|---|
| CP1 | N501 | N502 |
| CP2 | N501→null | N502→null |
| CP3 | N502 | N502 |
| CP4 | N504 | N503 |

| | N502 | N503 |
|---|---|---|
| N502 | 1 | 1 |
| N503 | 1 | 1 |

| CP PAIR | REACHABILITY |
|---|---|
| CP1-CP5 | OK→NG |
| CP2-CP5 | OK |
| CP3-CP5 | OK |
| CP4-CP5 | OK |

| CP PAIR | REACHABILITY |
|---|---|
| CP1-CP4 | OK |
| CP2-CP4 | OK→NG |
| CP3-CP4 | OK |

| NODE NO. | IF NUMBER | CONNECTION DESTINATION | OPERATION |
|---|---|---|---|
| N501 | IF1/0/1 | N505 | U→D |
| N502 | IF1/0/1 | N505 | UP |
| N505 | IF0/0/1 | N501 | U→D |
| N505 | IF0/0/2 | N502 | UP |

| CP | UPPER CP |
|---|---|
| CP1 | N501 |
| CP2 | N501 |
| CP3 | N501 |
| CP4 | N502 |

| CP | UPPER CP |
|---|---|
| CP1 | N501 |
| CP2 | N501 |
| CP3 | N502 |

|  | N501 | N502 | N505 |
|---|---|---|---|
| N501 | 1 | 0 | 1→0 |
| N502 | 0 | 1 | 1 |
| N505 | 1→0 | 1 | 1 |

170E

| CP  | UPPER CP |           |
|-----|----------|-----------|
| CP1 | N501     | N502→null |
| CP2 | N501     | N502→null |
| CP3 | N501     | N502→null |
| CP4 | N502     | N502      |

| CP  | UPPER CP |           |
|-----|----------|-----------|
| CP1 | N501     | N502→null |
| CP2 | N501     | N502→null |
| CP3 | N502     | N502      |

| CP PAIR | REACHABILITY |
|---------|--------------|
| CP1-CP4 | OK→NG        |
| CP2-CP4 | OK→NG        |
| CP3-CP4 | OK→NG        |

| CP PAIR | REACHABILITY |
|---------|--------------|
| CP1-CP3 | OK→NG        |
| CP2-CP3 | OK→NG        |

| NODE NO. | IF NUMBER | CONNECTION DESTINATION | OPERATION |
|---|---|---|---|
| N502 | IF1/1/1 | N503 | UP |
| N503 | IF1/1/1 | N502 | UP |

| CP | UPPER CP | |
|---|---|---|
| CP1 | N501 | N502→null |
| CP2 | N501 | N502→null |
| CP3 | N501 | N502→null |
| CP4 | N502 | N502 |
| CP5 | N504 | N503 |

| CP | UPPER CP | |
|---|---|---|
| CP1 | N501 | N502→null |
| CP2 | N501 | N502→null |
| CP3 | N502 | N502 |
| CP4 | N504 | N503 |

| | N502 | N503 |
|---|---|---|
| N502 | 1 | 1 |
| N503 | 1 | 1 |

| CP PAIR | REACHABILITY |
|---|---|
| CP1-CP5 | OK→NG |
| CP2-CP5 | OK→NG |
| CP3-CP5 | OK→NG |
| CP4-CP5 | OK |

| CP PAIR | REACHABILITY |
|---|---|
| CP1-CP4 | OK→NG |
| CP2-CP4 | OK→NG |
| CP3-CP4 | OK |

Fig. 26B

MONITORING DEVICE, NETWORK FAULT MONITORING SYSTEM, AND MONITORING METHOD

CROSS-REFERENCE TO RELATED APPLICATIONS

This application is a National Stage application under 35 U.S.C. § 371 of International Application No. PCT/JP2019/005920, having an International Filing Date of Feb. 18, 2019, which claims priority to Japanese Application Serial No. 2018-028316, filed on Feb. 20, 2018. The disclosure of the prior application is considered part of the disclosure of this application, and is incorporated in its entirety into this application.

TECHNICAL FIELD

The present invention relates to a monitoring device, a network fault monitoring system, and a monitoring method for detecting a fault in communication between users in a virtual network.

BACKGROUND ART

As one of network connection services provided by communication companies, there is a virtual network (VPN) service that builds a virtual network tunnel on a physical network and provides the virtual network tunnel for a user. When a fault occurs in a network device configuring a physical network or a link (physical link) between network devices, a fault occurs also in a virtual network that passes through the network device or the link. When a fault occurs, reachability between user sites (VPN sites) connected to the VPN (able to communicate between VPN sites) is lost.

As technologies for detecting a fault in a virtual network, there is a method using a monitoring signal, a method of monitoring traffic, and the like. In a technology described in PTL 1, a monitoring signal is transmitted between VPN sites, and a fault is detected in accordance with a lack of a monitoring signal. In a technology described in PTL 2, by mirroring and analyzing traffic at VPN sites, a fault in an underlay network is detected. By using the flow monitoring technology described in NPL 1, traffic in a VPN is identified using attributes of communication packets such addresses and the like of network devices, and a fault can be detected by analyzing the identified traffic.

CITATION LIST

Patent Literature

PTL1: JP 5424349 B
PTL2: JP 2010-88031 A

Non Patent Literature

NPL1: Cisco Systems NetFlow Services Export Version 9, Request for Comments 3954, Internet Engineering Task Force, October 2004, [online], [Searched on Jan. 26, 2011], Internet <URL:https://www.ietf.org/rfc/rfc3954.txt>

SUMMARY OF THE INVENTION

Technical Problem

Fault detection using monitoring signals is advantageous in that it can be used even in inexpensive communication devices. However, in order to increase a detection speed in a case in which there is a large number of VPNs and sites thereof (connection points of users and VPNs), many monitoring signals are transmitted, and there is a problem in that network bandwidth is suppressed. Fault detection using mirroring requires a device for mirroring, and there is a problem in that that the cost becomes high. Fault detection using flow monitoring is advantageous in that occurrence of a fault can be quickly detected. However, there is a problem in that no flow monitoring function is provided in general network devices such as a white box switch and the like.

The present invention is realized in view of such a background, and an object of the present invention is to provide a monitoring device, a network fault monitoring system, and a method enabling reachability between connection points between a VPN and a user to be quickly identified on the basis of fault information of a physical network in a large-scale network including many network devices and virtual networks.

Means for Solving the Problem

In order to solve the problems described above, an embodiment of the present invention according to claim 1 is a monitoring device operable to make up (a part of) a network fault monitoring system operable to monitor reachability between a user connection point and another user connection point of a plurality of user connection points in a virtual network built on a network having layers made up with aggregations of network devices, the user connection points representing connection points between the virtual network and a user side and being included in the network devices, wherein, in a case in which a plurality of monitoring devices constitute a layer corresponding to a monitoring target layer of the aggregations of the network devices, and among the plurality of monitoring devices monitoring the aggregations of the network devices, the monitoring device belongs to an N-th layer that is an upper layer with respect to a first layer, the first layer being a lowermost layer among a plurality of the layers of the plurality of monitoring devices, the monitoring device determines reachability between the user connection point and the another connection point included in different aggregations belonging to an (N−1)-th layer on the basis of connection statuses between connection point network devices representing network devices connecting different aggregations belonging the (N−1)-th layer, each of the different aggregations being an element of a monitoring target aggregation of the N-th layer, and information of reachability from the user connection point to the connection point network devices belonging to the aggregation of the (N−1)-th layer including the user connection point, the information of reachability being received from the monitoring devices belonging to a lower layer.

In addition, an embodiment of the present invention according to the claims is a monitoring method of a monitoring device operable to make up (a part of) a network fault monitoring system operable to monitor reachability between a user connection point and another user connection point of a plurality of user connection points in a virtual network built on a network having layers made up with aggregations of network devices, the user connection point representing connection points between the Virtual network and a user side and being included in the network devices, a plurality of the monitoring devices constituting a layer corresponding to a monitoring target layer of the aggregations of the network devices, the monitoring method including: determining reachability between the plurality of user connection points included in different aggregations belonging to an (N−1)-th layer on the basis of connection statuses between connection point network devices representing network devices connecting different aggregations belonging the (N−1)-th layer, each of the different aggregations being an element of a monitoring target aggregation of an N-th layer, and information of reachability from the user connection points to the connection point network devices belonging to the aggregation of the (N−1)-th layer including the user connection points, the information of reachability being received from the monitoring devices belonging to a lower layer, by the monitoring devise belonging to an N-th layer that is an upper layer with respect to a first layer, among the plurality of the monitoring devices monitoring the aggregations of the network devices, the first layer being a lowermost layer.

By employing such a configuration, a monitoring device of an upper layer with respect to the first layer of the network fault monitoring system can determine reachability of a pair of user connection points included in different network devices by being triggered upon a change in the connection status between network devices or a notification from the monitoring device of the lower layer.

An embodiment of the present invention according to claim 2 is a monitoring device operable to make up (a part of) a network fault monitoring system operable to monitor reachability between a user connection point and another user connection point of a plurality of user connection points in a virtual network built on a network having layers made up with aggregations of network devices, the user connection point representing connection points between the virtual network and a user side and being included in the network devices, the monitoring device including, in a case in which a plurality of monitoring devices constitute a layer corresponding to a monitoring target layer of the aggregations of the network devices, and among the plurality of monitoring devices monitoring the aggregations of the network devices, the monitoring device belongs to an N-th layer that is an upper layer with respect to a first layer, the first layer being a lowermost layer among a plurality of layers of the plurality of monitoring devices, a storage unit configured to store a higher-rank connection point reachability information database of an N-th layer storing (N+1) items in association with each other and an inter-connection point reachability information database of the N-th layer storing a pair of user connection points of which higher-rank connection points of an (N−1)-th layer are different in the higher-rank connection point reachability information database of the N-th layer and reachability of the pair of user connection points in association with each other, the (N+1) items including the user connection point and higher-rank connection points from a higher-rank connection point of the first layer to a higher-rank connection point of the N-th layer, the higher-rank connection point of the first layer representing a network device that can be reached from the user connection point and being included in a monitoring target aggregation of the first layer, the higher-rank connection point of the N-th layer representing a network device that can be reached from the user connection point and connecting a monitoring target aggregation of the N-th layer different from a monitoring target aggregation of the monitoring device to the monitoring target aggregation of the monitoring device; a higher-rank connection point reachability information updating unit of the N-th layer; an inter-connection point reachability information updating unit of the N-th layer; and an upper-layer notification unit of the N-th layer, wherein the higher-rank connection point reachability information updating unit of the N-th layer, when a change occurs in a connection status between connection point network devices representing network devices connecting the aggregations of the (N−1)-th layer, which are elements of monitoring target aggregations of the N-th layer, updates the higher-rank connection point reachability information database of the N-th layer such that the higher-rank connection point of the N-th layer of a user connection point whose higher-rank connection point of the (N−1)-th layer is one of the connection point network devices having changed reachability for the higher-rank connection point of the N-th layer in accordance with the change in the connection status is updated to a) "none" in a case in which reachability between the higher-rank connection point of the (N−1)-th layer and the higher-rank connection point of the N-th layer is "present", b) "none" in a case in which the reachability between the higher-rank connection point of the (N−1)-th layer and the higher-rank connection point of the N-th layer is "absent", c) "none" in a case in which a value of the higher-rank connection point of the (N−1)-th layer changes to "none", or d) the higher-rank connection point of the N-th layer that can be reached from the one of the connection point network devices, in a case in which a value of the higher-rank connection point of the (N−1)-th layer changes from "none" to the connection point network device becoming the higher-rank connection point of the (N−1)-th layer, the inter-connection point reachability information updating unit of the N-th layer updates the inter-connection point reachability information database of the N-th layer, when a change in a connection status between the connection point network devices occurs, such that the reachability between a pair of user connection points whose higher-rank connection points of the (N−1)-th layer are the connection point network devices having changed reachability in accordance with the change in the connection status between connection point network devices is updated in accordance with the change in the connection status between the connection point network devices, the inter-connection point reachability information updating unit of the N-th layer, when a change occurs in the reachability between one of the connection point network devices and one of the higher-rank connection points of the (N−1)-th layer corresponding to the user connection point, updates the reachability between a pair of user connection points including the user connection point corresponding to the higher-rank connection points of the (N−1)-th layer having the change in accordance with the reachability between the higher-rank connection points of the (N−1)-th layers of the pair of user connection points or the reachability between each of the higher-rank connection points of the (N−1)-th layers of the pair of user connection points and each of the pair of user connection points, and the upper-layer notification unit of the N-th layer, when the N-th layer is a layer lower than an uppermost layer, transmits updated information of the higher-rank connection point reachability information database of the N-th layer to a monitoring device of an upper layer with respect to the N-th layer.

By employing such a configuration, the monitoring device of an upper layer with respect to the first layer of the network fault monitoring system can detect a loss of reachability of a pair of user connection points included in different network devices by being triggered upon a change in the connection status between network devices or a change in the higher-rank connection point of the user connection point.

An embodiment of the present invention according to claim 3 is the monitoring device according to claim 2, wherein the higher-rank connection point reachability information updating unit of the N-th layer and the inter-connection point reachability information updating unit of the N-th layer detect that the connection status between the connection point network devices has been changed by receiving a notification of a change in an operation status of an interface to which a link connecting the connection point network devices is connected from the connection point network device.

By employing such a configuration, the monitoring device of an upper layer with respect to the first layer can detect a change in the connection status between network devices by receiving a notification of a fault of the interface from the network device.

An embodiment of the present invention according to claim 4 is the monitoring device according to claim 2, wherein, in a case in which the monitoring target of the N-th layer that is an upper layer with respect to the first layer has a plurality of higher-rank connection points of the N-th layer, the higher-rank connection point reachability information database of the N-th layer stores the plurality of higher-rank connection points of the N-th layer that can be reached from the user connection point, and the upper-layer notification unit of the N-th layer transmits updated information of the higher-rank connection point reachability information database of the N-th layer including the plurality of higher-rank connection points of the N-th layer to a monitoring device of an upper layer with respect to the N-th layer.

By employing such a configuration, even if there are a plurality of higher-rank connection points that are connection points between aggregations of network devices that are monitoring targets, a loss of reachability of a pair of user connection points can be detected.

An embodiment of the present invention according to claim 5 is a monitoring device operable to make up (a part of) a network fault monitoring system operable to monitor reachability between a user connection point and another user connection point of a plurality of user connection points in a virtual network built on a network having layers made up with aggregations of network devices, the user connection point representing connection points between the virtual network and a user side and being included in the network devices, the monitoring device including in a case in which a plurality of monitoring devices constitute a layer corresponding to a monitoring target layer of the aggregations of the network devices, and among the plurality of monitoring devices monitoring the aggregations of the network devices, the monitoring device belongs to a first layer that is a lowermost layer among a plurality of layers of the plurality of monitoring devices, a storage unit configured to store a higher-rank connection point reachability information database of the first layer storing the user connection point and a higher-rank connection point of the first layer in association with each other, an inter-connection point reachability information database of the first layer storing a pair of user connection points included in monitoring target network devices of the monitoring device belonging to the first layer and reachability of the pair of user connection points in association with each other, the higher-rank connection point of the first layer representing a network device that can be reached from the user connection point and being included in a monitoring target aggregation of the first layer; a higher-rank connection point reachability information updating unit of the first layer; an inter-connection point reachability information updating unit of the first layer; and an upper-layer notification unit of the first layer, wherein the higher-rank connection point reachability information updating unit of the N-th layer, when a change occurs in an operation status of an interface of the network device corresponding to the user connection point, updates the higher-rank connection point reachability information database of the first layer such that the higher-rank connection point of the first layer of the user connection point is updated to a) the network device included in the monitoring target aggregation of the first layer in a case in which the operation status is "activated", or b) "none" in a case in which the operation status is "deactivated", the inter-connection point reachability information updating unit of the first layer updates the inter-connection point reachability information database of the first layer, when a change occurs in an operation status of the interface of the network device corresponding to the user connection point, such that the reachability between a pair of user connection points including the user connection point is updated to a) "present" in a case in which an interface corresponding to both of the pair of user connection points is "activated", or b) "absent" in a case in which the interface corresponding to both of the pair of user connection points is "deactivated", and the upper-layer notification unit of the first layer transmits updated information of the higher-rank connection point reachability information database of the first layer to a monitoring device of an upper layer.

By employing such a configuration, the monitoring device of the first layer of the network fault monitoring system can detect a loss of reachability of a pair of user connection points included in one network device by being triggered upon a change in the operation status of an interface corresponding to the user connection point.

An embodiment of the present invention according to claim 6 is the monitoring device according to claim 5, including: the storage unit configured to further store a higher-rank connection point reachability information database of an N-th layer storing (N+1) items in association with each other and an inter-connection point reachability information database of the N-th layer storing a pair of user connection points of which higher-rank connection points of an (N−1)-th layer are different in the higher-rank connection point reachability information database of the N-th layer and reachability of the pair of user connection points in association with each other, the (N+1) items including the user connection point and higher-rank connection points from a higher-rank connection point of the first layer to a higher-rank connection point of the N-th layer, the higher-rank connection point of the first layer representing a network device that can be reached from the user connection point and being included in a monitoring target aggregation of the first layer, the higher-rank connection point of the N-th layer representing a network device that can be reached from the user connection point and connecting a monitoring target aggregation of the N-th layer different from a monitoring target aggregation of the monitoring device to the monitoring target aggregation of the monitoring device; a higher-rank connection point reachability information updating unit of the N-th layer; an inter-connection point reachability information updating unit of the N-th layer; and an upper-layer notification unit of the N-th layer, wherein the higher-rank connection point reachability information updating unit of the N-th layer, when a change occurs in a connection status between connection point network devices representing network devices connecting the aggregations of the (N−1)-th layer, which are elements of monitoring target aggregations of the N-th layer, updates the higher-rank connection point reachability information database of the N-th layer such that the higher-rank connection point of the N-th layer of a user connection point whose higher-rank connection point of the (N−1)-th layer is one of the connection point network devices having changed reachability for the higher-rank connection point of the N-th layer in accordance with the change in the connection status is updated to a) "none" in a case in which reachability between the higher-rank connection point of the (N−1)-th layer and the higher-rank connection point of the N-th layer is "present", b) "none" in a case in which the reachability between the higher-rank connection point of the (N−1)-th layer and the higher-rank connection point of the N-th layer is "absent", c) "none" in a case in which a value of the higher-rank connection point of the (N−1)-th layer changes to "none", or d) the higher-rank connection point of the N-th layer that can be reached from the one of the connection point network devices, in a case in which a value of the higher-rank connection point of the (N−1)-th layer changes from "none" to the connection point network device becoming the higher-rank connection point of the (N−1)-th layer, the inter-connection point reachability information updating unit of the N-th layer updates the inter-connection point reachability information database of the N-th layer, when a change in a connection status between the connection point network devices occurs, such that the reachability between a pair of user connection points whose higher-rank connection points of the (N−1)-th layer are the connection point network devices having changed reachability in accordance with the change in the connection status between connection point network devices is updated in accordance with the change in the connection status between the connection point network devices, the inter-connection point reachability information updating unit of the N-th layer, when a change occurs in the reachability between one of the connection point network devices and one of the higher-rank connection points of the (N−1)-th layer corresponding to the user connection point, updates the reachability between a pair of user connection points including the user connection point corresponding to the higher-rank connection points of the (N−1)-th layer having the change in accordance with the reachability between the higher-rank connection points of the (N−1)-th layers of the pair of user connection points or the reachability between each of the higher-rank connection points of the (N−1)-th layers of the pair of user connection points and each of the pair of user connection points, and the upper-layer notification unit of the N-th layer, when the N-th layer is a layer lower than an uppermost layer, transmits updated information of the higher-rank connection point reachability information database of the N-th layer to a monitoring device of an upper layer with respect to the N-th layer.

By employing such a configuration, one monitoring device can detect a loss of the reachability of a pair of user connection points over a plurality of layers, and accordingly, the network can be monitored using a small number of monitoring devices.

An embodiment of the present invention according to claim 7 is a network fault monitoring system operable to monitor reachability between a user connection point and another user connection point of a plurality of user connection points in a virtual network built on a network having layers made up with aggregations of network devices, the user connection point representing connection points between the virtual network and a user side and being included in the network devices, wherein a plurality of monitoring devices constitute a layer corresponding to a monitoring target layer of the aggregations of the network devices, and among the plurality of monitoring devices monitoring the aggregations of the network devices, the monitoring device according to claim 5 belongs to a first layer that is a lowermost layer, and the monitoring device according to claim 2 belongs to an upper layer with respect to the first layer.

By employing such a configuration, the network fault monitoring system can detect a loss of reachability of a pair of user connection points in each layer by being triggered upon a change in the operation status of an interface of the network device and a change in the connection status between network devices. In addition, one monitoring device can decrease the number of pairs of user connection points that are detection targets, and pairs of user connection points influenced by the fault can be identified at a high speed.

An embodiment of the present invention according to claim 8 is the network fault monitoring system according to claim 7, wherein an upper-layer notification unit of the first layer of the monitoring device of the first layer transmits updated information of the inter-connection point reachability information database of the first layer according to the inter-connection point reachability information updating unit of the first layer according to claim 5 to a monitoring device of an uppermost layer, an upper-layer notification unit of an N-th layer of the monitoring device of the N-th layer, the N-th layer being an upper layer with respect to the first layer, transmits updated information of the inter-connection point reachability information database of the N-th layer according to the inter-connection point reachability information updating unit of the N-th layer to a monitoring device of the uppermost layer in a case in which the N-th layer is a lower layer with respect to the uppermost layer, and wherein an upper-layer notification unit of the monitoring device of the uppermost layer transmits the updated information received from the monitoring device of the lower layer and updated information of an inter-connection point reachability information database of the monitoring device of the uppermost layer according to an inter-connection point reachability information updating unit of the monitoring device of the uppermost layer to a monitoring terminal of a monitoring person.

By employing such a configuration, the network fault monitoring system can quickly notify a monitoring person of pairs of user connection points influenced by a fault.

Effects of the Invention

According to the present invention, a monitoring device, a network fault monitoring system, and a monitoring method that enable quick identification of reachability between connection points between a VPN and a user on the basis of fault information of a physical network in a large-scale network including a plurality of network devices and virtual networks can be provided.

BRIEF DESCRIPTION OF DRAWINGS

FIG. 4 is a diagram showing a data configuration of a connection point-interface association information database of a monitoring device of a first layer according to this embodiment.

FIG. 5 is a diagram showing a data configuration of an interface information database of a monitoring device of a first layer according to this embodiment.

FIGS. 6A and 6B are diagrams showing data configurations of adjacency relation information databases of a monitoring device of a first layer according to this embodiment.

FIGS. 7A and 7B are diagrams showing data configurations of higher-rank connection point reachability information databases of a monitoring device of a first layer according to this embodiment.

FIGS. 8A and 8B are diagrams showing data configurations of inter-connection point reachability information databases of a monitoring device of a first layer according to this embodiment.

FIG. 9 is a diagram showing a data configuration of an interface information database of a monitoring device of a second layer according to this embodiment.

FIGS. 10A and 10B are diagrams showing data configurations of a lower layer higher-rank connection point reachability information database of a monitoring device of a second layer according to this embodiment.

FIG. 11 is a diagram showing a data configuration of an adjacency relation information database of a monitoring device of a second layer according to this embodiment.

FIGS. 12A and 12B are diagrams showing data configurations of higher-rank connection point reachability information databases of a monitoring device of a second layer according to this embodiment.

FIGS. 13A and 13B are diagrams showing data configurations of inter-connection point reachability information databases of a monitoring device of a second layer according to this embodiment.

FIG. 14 is a diagram showing a data configuration of an interface information database of a monitoring device of a third layer according to this embodiment.

FIGS. 15A and 15B are diagrams showing data configurations of lower layer higher-rank connection point reachability information databases of a monitoring device of a third layer according to this embodiment.

FIG. 16 is a diagram showing a data configuration of an adjacency relation information database of a monitoring device of a third layer according to this embodiment.

FIGS. 17A and 17B are diagrams showing data configurations of an inter-connection point reachability information database of a monitoring device of a third layer according to this embodiment.

FIG. 18 is a diagram showing a data configuration of an interface information database of a monitoring device of a second layer according to this embodiment.

FIGS. 19A and 19B are diagrams showing data configurations of lower layer higher-rank connection point reachability information databases of a monitoring device of a second layer according to this embodiment.

FIG. 20 is a diagram showing a data configuration of an adjacency relation information database of a monitoring device of a second layer according to this embodiment.

FIGS. 21A and 21B are diagrams showing data configurations of higher-rank connection point reachability information databases of a monitoring device of a second layer according to this embodiment.

FIGS. 22A and 22B are diagrams showing data configurations of inter-connection point reachability information databases of a monitoring device of a second layer according to this embodiment.

FIG. 23 is a diagram showing a data configuration of an interface information database of a monitoring device of a third layer according to this embodiment.

FIGS. 24A and 24B are diagrams showing data configurations of lower layer higher-rank connection point reachability information databases of a monitoring device of a third layer according to this embodiment.

FIG. 25 is a diagram showing a data configuration of an adjacency relation information database of a monitoring device of a third layer according to this embodiment.

FIGS. 26A and 26B are diagrams showing data configurations of inter-connection point reachability information databases of a monitoring device of a third layer according to this embodiment.

DESCRIPTION OF EMBODIMENTS

Figures 1, 2:
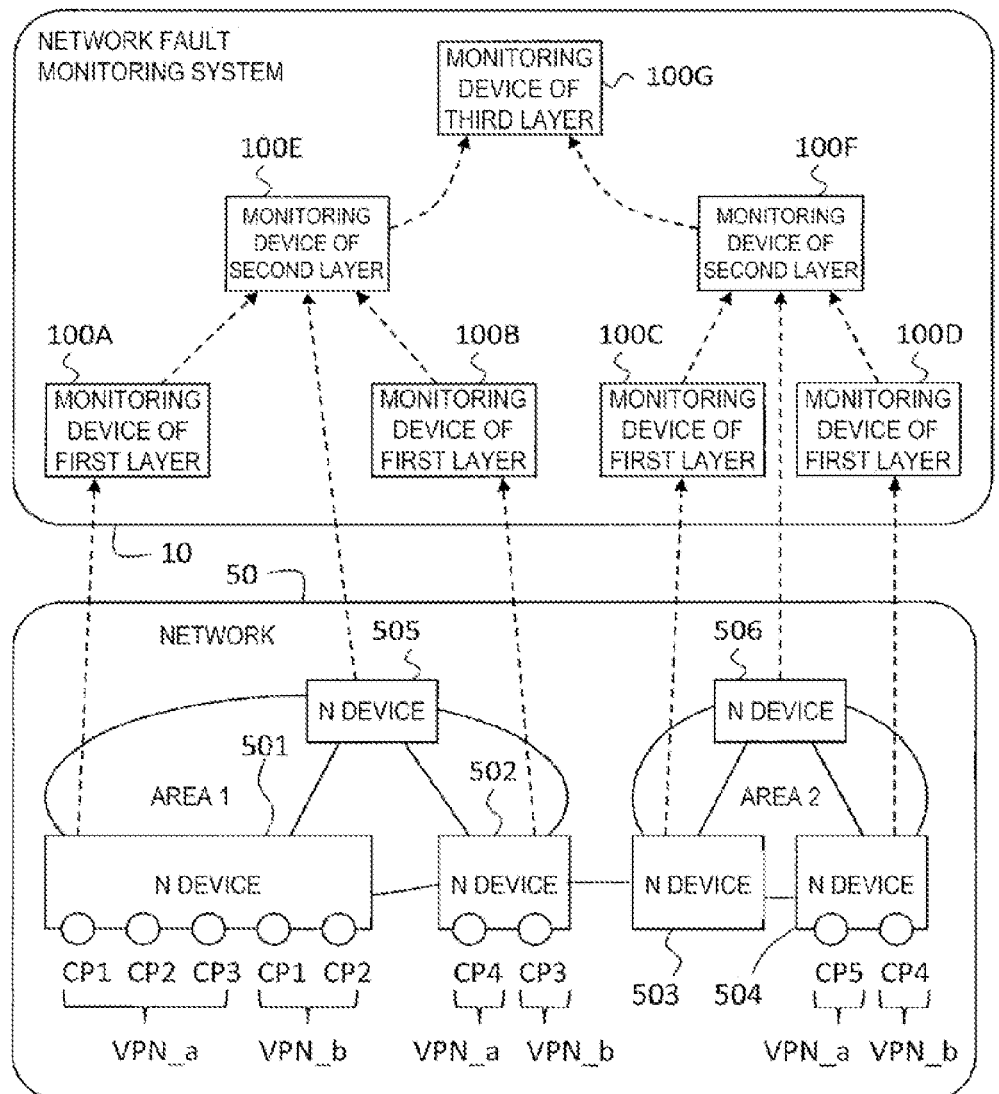
FIG. 1 is a diagram illustrating an overall configuration of a network fault monitoring system and a network that is a monitoring target thereof according to an embodiment of the present invention.
FIG. 2 is a table in which monitoring targets, connection points, and higher-rank connection points of first to third layers are arranged according to this embodiment.

Hereinafter, a network fault monitoring system according to a form (an embodiment) for performing the present invention will be described. FIG. 1 is a diagram illustrating an overall configuration of a network fault monitoring system 10 and a network 50 that is a monitoring target thereof according to this embodiment.

Overall Configuration of Network and Network Fault Monitoring System

The network 50 is divided into two networks of area 1 and area 2. The network of area 1 is composed of a network device (shown as an N device in FIG. 1) 501, a network device 502, a network device 505, a physical link (a link) connecting the network device 501 and the network device 505, and a link connecting the network device 502 and the network device 505. The network device 505 is a network device of an upper layer that connects the network device 501 and the network device 502.

The network of the area 2 includes a network device 503, a network device 504, a network device 506, a link connecting the network device 503 and the network device 506, and a link connecting the network device 504 and the network device 506. The network device 506 is an upper-layer network device that connects the network device 503 and the network device 504. When individual network devices do not need to be identified, each network device will be referred to as a network device 500.

The network device 502 and the network device 503 are connected using a link, and this link makes up one physical network by connecting the network of the area 1 and the network of the area 2. In this way, the network 50 makes up three layers: the network devices 501 to 504, the areas 1 and 2, and the entire network 50.

Two virtual networks VPN_a and VPN_b are built on this physical network. A virtual network is connected to a user site through a connection point (CP; a user connection point: a connection point between a virtual network and a user side) attached to the network device 500.

In the virtual network VPN_a, there are five user connection points including connection points CP1 to CP3 in the network device 501, a connection point CP4 in the network device 502, and a connection point CP5 in the network device 504. In the virtual network VPN_b, there are four user connection points including connection points CP1 to CP2 in the network device 501, a connection point CP3 in the network device 502, and a connection point CP4 in the network device 504. A number following "CP" is a serial number in each virtual network, and the same connection point CP1 is present in a plurality of virtual networks.

The network fault monitoring system 10 that monitors the network 50 is composed of a plurality of monitoring devices 100A to 100G and monitors reachability between user connection points (that communication is possible between two user connection points). When individual monitoring devices do not need to be identified, each monitoring device will be referred to as a monitoring device 100.

The monitoring device 100 is not limited to having one network device 500 as a monitoring target, and there are monitoring devices 100 respectively having a network of one area, having a network of a plurality of areas, and having a network of an upper layer as monitoring targets. In FIG. 1, the monitoring device 100A has the network device 501 as its monitoring target, the monitoring device 100B has the network device 502 as its monitoring target, the monitoring device 100C has the network device 503 as its monitoring target, the monitoring device 100D has the network device 504 as its monitoring target, the monitoring device 100E has area 1 as its monitoring target, the monitoring device 100F has area 2 as its monitoring target, and the monitoring device 100G has the entire network 50 as its monitoring target.

The monitoring devices 100 that makes up the network fault monitoring system 10 constitute a hierarchical structure (a tree structure). A first layer is a layer formed from the monitoring devices 100 each having the network device 500, which has a user connection point, as its monitoring target, and the monitoring devices 100A to 100D are monitoring devices 100 of the first layer. A second layer is a layer formed from monitoring devices 100 each having an area, which is a set (an aggregation) of network devices 500, as its monitoring target, and the monitoring devices 100E to 100F are monitoring devices 100 of the second layer. A third layer is a layer formed from a monitoring device 100 having the entire network, which is a set (an aggregation) of areas, as its monitoring target, and the monitoring device 100G is a monitoring device 100 of the third layer. The hierarchy of this monitoring device 100 corresponds to a hierarchy of network devices, areas, and the entire network in the network 50. In this embodiment, although the third layer is the highest layer, there are more layers in a larger-scale network.

Each monitoring device 100 is not limited to one physical device but is a logical monitoring device having one network device, one area, a plurality of areas, or an area of a further upper layer as its monitoring target. One monitoring device 100 may correspond to one virtual machine, or a plurality of monitoring devices 100 may operate on one virtual machine.

In each layer, a connection point with another monitoring target belonging to the layer will be referred to as a higher-rank connection point. A group of monitoring targets to which a higher-rank connection point is connected through physical links become monitoring targets of a layer that is higher by one rank. For example, in the second layer, the monitoring target is an area, and a higher-rank connection point of area 1 is the network device 502. A group of area 1 and area 2 connected through a link between the network device 502 and the network device 503, which are higher-rank connection points of the second layer, is the network 50, and the network 50 becomes a monitoring target of the third layer that is an upper layer.

The monitoring device 100 of a lower layer transmits information relating to a connection status of a user connection point to the monitoring device 100 of an upper layer. For example, the monitoring device 100A of the first layer transmits information relating to a user connection point to the monitoring device 100E of the second layer. The monitoring device 100E transmits information relating to a user connection point to the monitoring device 100G of the third layer.

FIG. 2 is a table in which monitoring targets, connection points, and higher-rank connection points of the first to third layers are arranged according to this embodiment. In the first layer, a monitoring target is a network device (or a set (an aggregation) formed from one network device) 500. A connection point (a user connection point) between a user and a VPN that is a connection point is included inside the network device. A higher-rank connection point in the first layer is a connection point that connects network devices 500, which are monitoring targets of the first layer, in other words, network devices themselves.

In the second layer, monitoring targets are areas (aggregations of network devices), and there are network devices 500 that are connection points inside the area. A higher-rank connection point in the second layer is a connection point connecting areas that are the monitoring targets of the second layer. In FIG. 1, network devices 502 and 503 connecting areas 1 and 2 become higher-rank connection points in the second layer. In the third layer, monitoring targets are entire networks (aggregations of areas), and there are network devices 502 and 503 that connect areas that are connection points inside the network. The third layer is the uppermost layer, and there is no higher-rank connection point therein.

Generally, a network device 500 that becomes a connection point in two or more layers is also referred to as a connection point network device. A connection point (a connection point network device) in an N-th layer (here, N≥2) becomes a higher-rank connection point of the (N−1)-th layer (a connection point network device of an aggregation of the (N−1)-th layer). An interface of a connection point network device to which a physical link that connects connection point network devices is connected is also referred to as a connection point interface. In addition, in the first layer, an interface that becomes a user connection point is also referred to as a user connection point interface.

Overall Configuration of Monitoring Device

Figure 3:
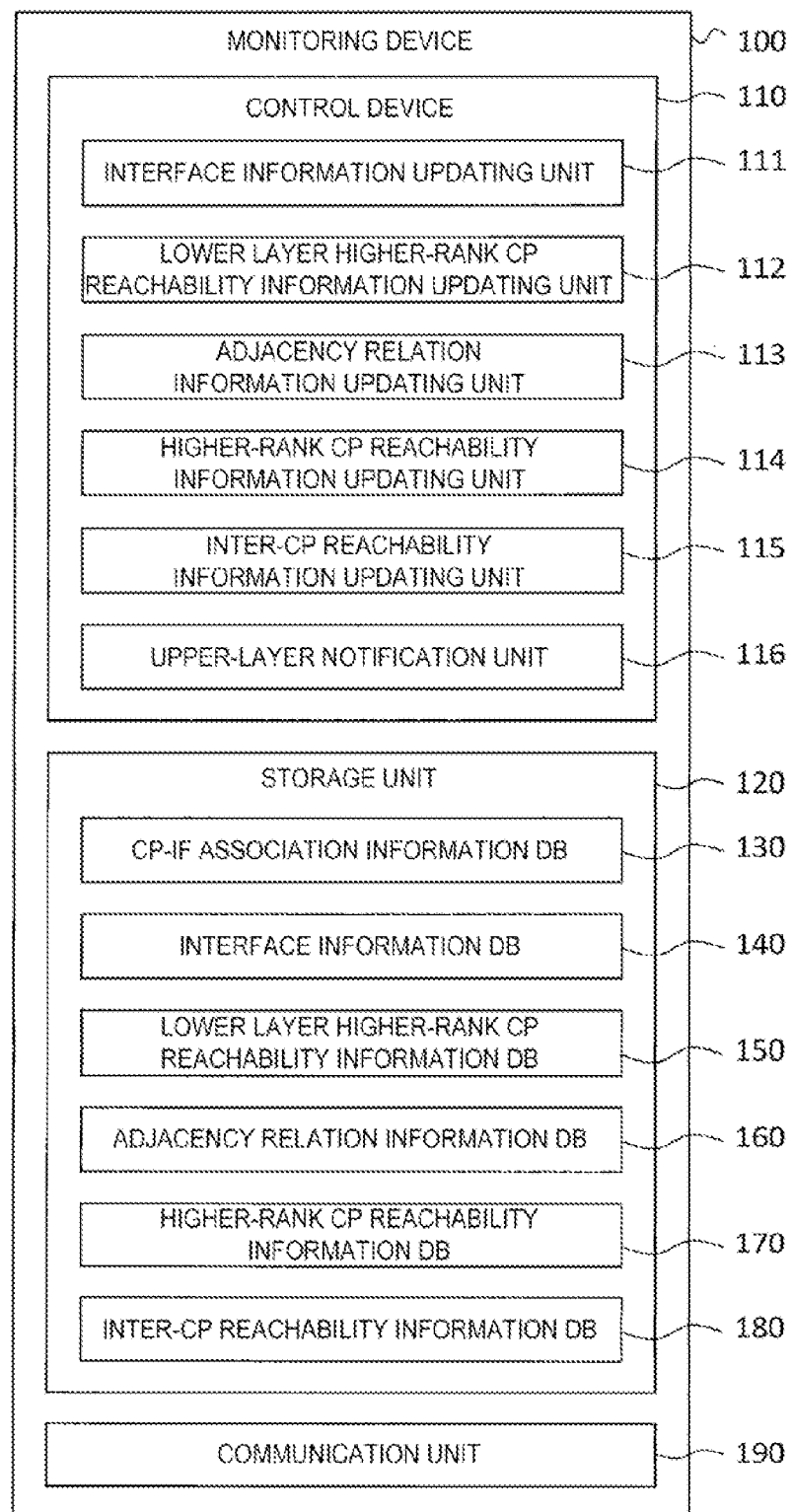
FIG. 3 is a diagram illustrating an overall configuration of a monitoring device according to this embodiment.

FIG. 3 is a diagram showing an overall configuration of the monitoring device 100 according to this embodiment. The monitoring device 100 is configured to include a control unit 110, a storage unit 120, and a communication unit 190. The control unit 110 is a functional unit that operates on a CPU (Central Processing Unit) of a device (a computer) in which the monitoring device 100 operates and includes an interface information updating unit 111, a lower layer higher-rank connection point reachability information updating unit (in FIG. 3, described as a lower layer higher-rank CP reachability information updating unit) 112, an adjacency relation information updating unit 113, a higher-rank connection point reachability information updating unit (described as a higher-rank CP reachability information updating unit in FIG. 3) 114, an inter-connection point reachability information updating unit (described as an inter-CP reachability information updating unit in FIG. 3) 115, and an upper-layer notification unit 116.

The storage unit 120 is configured from a storage device such as a Random Access Memory (RAM), a hard disk drive, or a flash memory of a device in which the monitoring device 100 operates and is configured to include a connection point—interface association information database (described as a CP-IF (Interface) association information DB (Database) in FIG. 3) 130, an interface information database 140, a lower layer higher-rank connection point reachability information database 150, an adjacency relation information database 160, a higher-rank connection point reachability information database 170, and an inter-connection point reachability information database 180.

The communication unit 190 is configured to receive a notification of activation (operation)/deactivation (UP/DOWN) of the interface from the network device 500 or data of the higher-rank connection point reachability information database 170 from the monitoring device 100 of a lower layer or transmits data of the higher-rank connection point reachability information database 170 or the inter-connection point reachability information database 180 to the higher-rank monitoring device 100. In a case in which the computer in which the monitoring device operates is a device other than the network device 500, the communication unit 190 corresponds to a Network Interface Card (NIC) and receives a notification from the network device 500.

Hereinafter, constituent elements of the storage unit 120 will be described, and then, constituent elements of the control unit 110 will be described.

Connection Point—Interface Association Information Database

FIG. 4 is a diagram showing a data configuration of a connection point-interface association information database 130A of a monitoring device 100 of a first layer according to this embodiment. The connection point-interface association information database 130A is, for example, data in a table form, and one record (row) represents an association between a user connection point of a virtual network and an interface of the network device 500 in the monitoring device 100 of the first layer.

The connection point-interface association information database 130A is configured to include attributes (columns) including a node number 131 representing a network device 500, a VPN 132 representing a virtual network, a CP 133 representing a user connection point, and an interface number (described as an IF number in FIG. 4) 134 representing an interface. A record 139 is a record of the connection point-interface association information database 130A of the monitoring device 100A of the first layer having a network device 501 as its monitoring target, and "N501" of the node number 131 represents a network device 501, and it represents that a user connection point "CP3" of "VPN_a" is associated with an interface "IF/0/0/3".

The connection point-interface association information database 130A is information registered when a virtual network is built and is not dynamically changed. In addition, in the monitoring devices 100 of the second and subsequent layers, there is no user connection point, and the connection point-interface association information database 130 becomes an empty database.

Interface Information Database

FIG. 5 is a diagram showing a data configuration of an interface information database 140A of a monitoring device 100 of a first layer according to this embodiment. The interface information database 140A is, for example, data in a table form, and one record represents an operation status of the interface of the monitoring device 100.

The interface information database 140A is configured to include attributes including a node number 141 representing a network device 500, an interface number 142 used for identifying an interface inside the network device 500, a connection destination 143, and an operation 144 representing an operation status of the interface. In a case in which a link connected to the interface is another network device 500, the connection destination 143 represents a network device 500 of this connection destination. In a case in which the interface corresponds to a user connection point of a virtual network, the connection destination 143 becomes "N/A".

A record 149 is a record of the interface information database 140A of the monitoring device 100A and represents that an interface of which the interface number 142 is "IF0/0/3" is activated ("UP"). In a case in which an interface is deactivated, "DOWN" is indicated. In addition, "U→D" of an operation 144 shown in FIG. 5 represents that a fault has occurred in the interface, and the operation status has been changed from "UP" to "DOWN". There is no operation status of "U→D", and the operation status is either "UP" or "DOWN".

An interface that becomes a record of the interface information database 140 is an interface that corresponds to a connection point that is a monitoring target. The interface information database 140A includes a record of an operation status of an interface corresponding to a user connection point (a connection point between a user and a virtual network) that is a connection point of the network device 501 that is a monitoring target of the monitoring device 100A of the first layer.

An interface information database 140B (see FIG. 9) to be described later includes records of operation statuses of interfaces to which links connecting the network devices 501, 502, and 505 that are connection points of area 1 that is a monitoring target of the monitoring device 100E of the second layer are connected.

An interface information database 140C (see FIG. 14) to be described later includes records of operation statuses of interfaces to which links linking network devices 502 and 503 connecting area 1 and area 2 that are connection points of the entire network that are monitoring targets of the monitoring device 100G of the third layer are connected.

Lower Layer Higher-Rank Connection Point Reachability Information Database The lower layer higher-rank connection point reachability information database 150, for example, is a data in a table form and is acquired by acquiring and combining higher-rank connection point reachability information databases 170 stored by the monitoring device 100 of a lower layer that is lower by one layer. The lower layer higher-rank connection point reachability information database 150 is present for each virtual network. Details of the lower layer higher-rank connection point reachability information database 150 will be described later after description of the higher-rank connection point reachability information database 170 to be described later.

Adjacency Relation Information Database

FIGS. 6A and 6B are diagrams showing data configurations of adjacency relation information databases 160A and 160B of a monitoring device 100 of a first layer according to this embodiment. The adjacency relation information databases 160A and 160B, for example, are data in a table form and represent connection statuses between connection points. Connection points described here are connection points of constituent elements of a monitoring target.

In the first layer, the monitoring target is a network device 500, and constituent elements thereof are user connection points. However, the adjacency relation information databases 160A and 160B in the first layer include connection statuses between connection points acquired by adding the network device 500 that is a higher-rank connection point to the user connection points.

In the second layer, the monitoring target is an area, and network devices of constituent elements thereof become connection points. For example, in the monitoring device 100E, network devices 501, 502, and 505 included in area 1 become connection points (see FIG. 11 to be described later).

In the third layer, the monitoring target is the entire network, and devices connecting areas that are the constituent elements thereof become connection points. For example, as connection points of a monitoring device 100G, network devices 502 and 503 connecting area 1 and area 2 become the connection points (see FIG. 16 to be described later).

FIG. 6A is an adjacency relation information database 160A of a virtual network VPN_a of the monitoring device 100A of the first layer having the network device 501 as its monitoring target. The adjacency relation information database 160A of the monitoring device 100A of the first layer represents connection statuses among user connection points CP1 to CP3 of the virtual network and the network device 501 that is a higher-rank connection point of the user connection points CP1 to CP3.

In the network device 500 of the first layer, it is assumed that different user connection points of the same virtual network are connected through the network device 500. For this reason, the same user connection points are connected (denoted by "1"), different user connection points are not connected (denoted by "0"), and a user connection point and a higher-rank connection point (denoted by higher-rank CP in FIGS. 6A and 6B) are connected. In FIG. 6A, for example, the adjacency relation between "CP2" and "CP2" is "connected" to be "1" and the adjacency relation between "CP2" and "CP3" is "non-connected" to be "0".

In FIG. 6A, the adjacency relation between CP1 and a higher-rank connection point being "1→0" represents that a fault has occurred in an interface corresponding to CP1, and the adjacency relation has been changed from "connected" to "disconnected". Thus, there is no connection state of "1→0", and the connection state is either "1" or "0".

Higher-Rank Connection Point Reachability Information Database

FIGS. 7A and 7B are diagrams showing data configurations of higher-rank connection point reachability information databases 170A and 170B of a monitoring device 100 of a first layer according to this embodiment. The higher-rank connection point reachability information databases 170A and 170B, for example, are data in a table form, and one record represents reachability of one user connection point for a higher-rank connection point (able to communicate between the user connection point and the higher-rank connection point). FIG. 7A is the higher-rank connection point reachability information database 170A of a virtual network VPN_a in the monitoring device 100A of the first layer having the network device 501 as its monitoring target.

The higher-rank connection point reachability information database 170A is configured to include attributes of a user connection point 171 and a higher-rank connection point 172 of the first layer. The higher-rank connection point 172 represents a higher-rank connection point that can be reached from the user connection point 171 and becomes "null" when there is not reachable connection point. A record 179 indicates that the higher-rank connection point of the user connection point CP3 is the network device 501. In FIG. 7A, a record of "CP1" being "N501→null" represents that a fault has occurred in an interface corresponding to CP1, and the higher-rank connection point 172 has changed from "N501" representing the network device 501 to "null". Thus, there is no higher-rank connection point of "N501→null".

The lower layer higher-rank connection point reachability information database 150 is acquired by combining data of the higher-rank connection point reachability information databases 170 notified from (a plurality of) monitoring devices 100 of a lower rank. For example, FIG. 10A to be described later is a lower layer higher-rank connection point reachability information database 150A of a virtual network VPN_a in the monitoring device 100E and is acquired by combining a higher-rank connection point reachability information database 170A of the virtual network VPN_a in the monitoring device 100A of the layer lower than the monitoring device 100E and a higher-rank connection point reachability information database 170 (not shown) of the virtual network VPN_a in another monitoring device 100B of the lower layer. In addition, a user connection point of the virtual network VPN_a in the monitoring device 100B is CP4 (see FIG. 1), and the higher-rank connection point reachability information database 170 of the virtual network VPN_a is only a record of CP4.

Inter-Connection Point Reachability Information Database

FIGS. 8A and 8B are diagrams showing data configurations of inter-connection point reachability information databases 180A of a monitoring device 100 of a first layer according to this embodiment. The inter-connection point reachability information database 180A, for example, is data in a table form, and one record represents presence/absence of reachability between a pair of user connection points, which form a pair of user connection points in one virtual network inside a monitoring target, not included in the inter-connection point reachability information database 180 of a lower layer (able to communicate between two user connection points forming a pair).

The inter-connection point reachability information databases 180A and 180B in a monitoring system of the first layer represent reachability between user connection points included in each virtual network inside the network device 500 that is a monitoring target. Inter-connection point reachability information databases 180C and 180D (see FIGS. 13A and 13B to be described later) in a monitoring system of the second layer represent reachability between user connection points, which are between user connection points included in each virtual network inside an area that is a monitoring target, not included in the inter-connection point reachability information database 180 of the monitoring device 100 of the first layer having network devices 500 making up an area as its monitoring target. In other words, the inter-connection point reachability information database 180 in the monitoring system of the second layer represents reachability between user connection points belonging to different network devices 500.

Inter-connection point reachability information databases 180E and 180F (see FIGS. 17A and 17B to be described later) in a monitoring system of the third layer represent reachability between user connection points, which are included in a respective virtual network inside a network that is a monitoring target and are not included in the inter-connection point reachability information database 180 of the monitoring device 100 of the second layer having areas making up a network as its monitoring targets. In other words, the inter-connection point reachability information database 180 in the monitoring system of the third layer represents reachability between user connection points belonging to network devices 500 of different areas.

FIG. 8A is the inter-connection point reachability information database 180A of the virtual network VPN_a in the monitoring device 100A of the first layer having the network device 501 as its monitoring target.

The inter-connection point reachability information database 180A is configured to include attributes of a user connection point pair (described as CP pair in FIGS. 8A and 8B) 181 and reachability 182. The reachability 182 represents presence/absence ("OK"/"NG" (not good)) of reachability between two user connection points shown in the user connection point pair 181.

A record 189 represents the presence of reachability between a user connection point CP2 and a user connection point CP3. In FIG. 8A, a record of "CP1-CP2" being "OK→NG" represents that a fault has occurred in an interface corresponding to CP1, and the reachability has been changed from "present" to "absent", and it is not the case that there is a reachability of "OK→NG".

Control Unit of Monitoring Device

Referring back to FIG. 3, the description of the constituent elements of the control unit 110 will be continued. The interface information updating unit 111 receives a notification of an operation status (a change in the operation status) of the interface from the network device 500 through the communication unit 190 and updates the interface information database 140.

The lower layer higher-rank connection point reachability information updating unit 112, from a monitoring device 100 of its lower layer, receives the data of the higher-rank connection point reachability information database 170 of the device through the communication unit 190 and combines the records, thereby updating its lower layer higher-rank connection point reachability information database 150.

The adjacency relation information updating unit 113 updates the adjacency relation information database 160 on the basis of the operation status of the interface corresponding to the connection point by referring to the interface information database 140.

The higher-rank connection point reachability information updating unit 114 analyzes the reachability from each user connection point to a higher-rank connection point by referring to the lower layer higher-rank connection point reachability information database 150 and the adjacency relation information database 160 and updates the higher-rank connection point reachability information database 170.

The inter-connection point reachability information updating unit 115 analyzes the reachability between a pair of user connection points, which is a pair of user connection points in a virtual network inside the monitoring target, not included in the inter-connection point reachability information database 180 of the monitoring device 100 of the lower layer by referring to the lower layer higher-rank connection point reachability information database 150 and the adjacency relation information database 160 and updates the inter-connection point reachability information database 180. In other words, the inter-connection point reachability information database 180 represents reachability between user connection points included in the monitoring target of the monitoring device 100 of a different lower layer.

The upper-layer notification unit 116 respectively transmits the data of the higher-rank connection point reachability information database 170 to a one-rank higher monitoring device 100 and the data of the inter-connection point reachability information database 180 to a monitoring device 100 of the highest rank through the communication unit 190.

The configuration of the monitoring device 100 has been described above. Subsequently, a fault detecting process of the network fault monitoring system 10 performed when a fault occurs an interface and a fault detecting process performed when a fault occurs in a physical link will be described.

Fault Detecting Process when Fault Occurs in Interface: Process of a Monitoring Device of First Layer The operation of the network fault monitoring system 10 in a case in which faults occur in an interface ("IF0/0/1" shown in FIG. 4) of the network device 501 corresponding to the user connection point CP1 of the virtual network VPN_a and an interface ("IF0/1/2" shown in FIG. 4) of the network device 501 corresponding to the user connection point CP2 of the virtual network VPN_b will be described with reference to FIG. 4 to FIG. 17B.

FIG. 4 to FIG. 8B are diagrams respectively showing the connection point-interface association information database 130A, the interface information database 140A, the adjacency relation information databases 160A and 160B, the higher-rank connection point reachability information databases 170A and 170B, and the inter-connection point reachability information databases 180A and 180B of the monitoring device 100A belonging to the first layer.

Fault Detecting Process when Fault Occurs in Interface: Update of Interface Information Database When an occurrence of a fault in an interface is detected, the network device 501 notifies the monitoring device 100A of the fault using a SNMP (Simple Network Management Protocol) trap. When the notification is received through the communication unit 190, the interface information updating unit 111 of the monitoring device 100A changes an operation 144 of a record corresponding to the interface number 142 of the interface in which the fault has occurred among records of the interface information database 140A (see FIG. 5) to "DOWN". In FIG. 5, "U→D" is described in attributes of operations 144 of "IF0/0/1" and "IF0/1/2".

In addition, in a case in which the interface has recovered from the fault, the interface information updating unit 111 changes a corresponding operation 144 from "DOWN" to "UP".

Fault Detecting Process when Fault Occurs in Interface: Update of Adjacency Relation Information Database The adjacency relation information updating unit 113 of the monitoring device 100A updates the adjacency relation information database 160 relating to a user connection point corresponding to the interface of which the operation has become "DOWN". More specifically, the adjacency relation information updating unit 113 updates adjacency relation between the user connection point CP1 of the virtual network VPN_a relating to the interface "IF0/0/1" and a higher-rank connection point with "0". In addition, the monitoring device 100A is a monitoring device of the first layer, and the higher-rank connection point is the network device 501 (see FIG. 2).

FIG. 6A is a diagram showing the adjacency relation information database 160A of the virtual network VPN_a stored by the monitoring device 100A, and the connection relation between the user connection point CP1 and the higher-rank connection point (described as "higher-rank CP" in FIG. 6A) as "1→0".

In addition, the adjacency relation information updating unit 113 updates the adjacency relation between the user connection point CP2 of the virtual network VPN_b relating to "IF0/1/2" and the higher-rank connection point with "0". FIG. 6B is a diagram showing the adjacency relation information database 160B of the virtual network VPN_b, the connection relation between the user connection point CP2 and the higher-rank connection point (described as "higher-rank CP" in FIG. 6B) is described as "1→0".

In addition, in a case in which an interface corresponding to the user connection point becomes "UP" from "DOWN", the adjacency relation information updating unit 113 updates the adjacency relation between a corresponding user connection point and the higher-rank connection point from "0" with "1".

Fault Detecting Process when Fault Occurs in Interface: Update of Higher-Rank Connection Point Reachability Information Database After updating the adjacency relation information database 160, the higher-rank connection point reachability information updating unit 114 of the monitoring device 100A updates the higher-rank connection point reachability information database 170. In the first layer, the higher-rank connection point is the network device 501, and identification information of the network device 501 is included in the higher-rank connection point with respect to the user connection point in the higher-rank connection point reachability information database 170. The higher-rank connection point reachability information updating unit 114 changes the higher-rank connection point of the user connection point in which the adjacency relation with the higher-rank connection point has been changed in the adjacency relation information database 160.

More specifically, the higher-rank connection point reachability information updating unit 114 changes the higher-rank connection point of CP1 of the higher-rank connection point reachability information database 170A (see FIG. 7A) corresponding to CP1 that has been changed in the adjacency relation information database 160A of the virtual network VPN_a to "null" (described as "N501→null" in FIG. 7A). In addition, the higher-rank connection point reachability information updating unit 114 changes the higher-rank connection point of CP2 of the higher-rank connection point reachability information database 170B (see FIG. 7B) corresponding to CP2 that has been changed in the adjacency relation information database 160B of the virtual network VPN_b to "null".

In addition, in a case in which the higher-rank connection point has been updated with "1" in the adjacency relation information database 160, the higher-rank connection point reachability information updating unit 114 updates the higher-rank connection point of the corresponding user connection point from "null" with the identification information of the network device 500.

Fault Detecting Process when Fault Occurs in Interface: Update of Inter-Connection Point Reachability Information Database After updating the adjacency relation information database 160, the inter-connection point reachability information updating unit 115 of the monitoring device 100A updates the inter-connection point reachability information database 180. In the first layer, it is determined whether or not two user connection points are reachable through the higher-rank connection point. In other words, the inter-connection point reachability information updating unit 115 determines presence of the reachability in a case in which each of the two user connection points has an adjacency relation with a higher-rank connection point, determines absence of the reachability in a case in which any one user connection point has no adjacency relation with the higher-rank connection point, and updates corresponding reachability in the inter-connection point reachability information database 180 with "OK" or "NG".

The inter-connection point reachability information updating unit 115 changes the reachability of "CP1-CP2" and "CP1-CP3" of the inter-connection point reachability information database 180A (see FIG. 8A) corresponding to CP1 that has been changed in the adjacency relation information database 160A of the virtual network VPN_a to "NG" (described as "OK→NG" in FIG. 8A). In addition, the inter-connection point reachability information updating unit 115 changes the reachability of "CP1-CP2" of the inter-connection point reachability information database 180B (see FIG. 8B) corresponding to CP2 that has been changed in the adjacency relation information database 160B of the virtual network VPN-b to "NG".

In addition, in a case in which the higher-rank connection point is updated with "1" in the adjacency relation information database 160, the inter-connection point reachability information updating unit 115 updates the reachability to "OK" in a case in which the pair includes the changed user connection point, and both higher-rank connection points of the pair are "1".

Fault Detecting Process when Interface Fault Occurs: Notification to Upper Layer When the higher-rank connection point reachability information database 170 or the inter-connection point reachability information database 180 is updated, the upper-layer notification unit 116 of the monitoring device 100A transmits the data of the higher-rank connection point reachability information databases 170A and 170B to monitoring device 100E of the second layer of a higher rank. In addition, the upper-layer notification unit 116 transmits the data of the inter-connection point reachability information databases 180A and 180B to the monitoring device 100G of the third layer which is the highest rank.

As above, the process of the monitoring device 100A of the first layer in a case in which a fault has occurred in the interface of the network device corresponding to the user connection point has been described. Also the monitoring device 100B similarly operates. Next, the process of the monitoring device 100E of the second layer will be described.

Fault Detecting Process when Fault Occurs in Interface: Process of the Monitoring Device of the Second Layer.

FIG. 9 to FIG. 13B respectively show the interface information database 140B of the monitoring device 100E belonging to the second layer, the lower layer higher-rank connection point reachability information databases 150A and 150B, the adjacency relation information database 160C, the higher-rank connection point reachability information databases 170C and 170D, and the inter-connection point reachability information databases 180C and 180D.

Fault Detecting Process when Fault Occurs in Interface: Update of Interface Information Database FIG. 9 is a diagram showing the data configuration of the interface information database 140B of the monitoring device 100E of the second layer according to this embodiment. The interface information database 140B stores an operation status of an interface to which a physical link connecting network devices 500 in the same area is connected. For example, in a record 148, it is represented that an interface "IF0/0/2" of the network device 505 is an interface to which a physical link connected to the network device 502 is connected and that the interface "IF0/0/2" is operating.

In this case, there is no abnormality in the interface connected to the network device, and an SNMP trap has not been received, and accordingly, the process of the interface information updating unit 111 of the monitoring device 100E is not executed.

Fault Detecting Process when Fault Occurs in Interface: Update of Lower Layer Higher-Rank Connection Point Reachability Information Database When the higher-rank connection point reachability information (the information of the higher-rank connection point reachability information database 170) is received from the monitoring device 100 of the lower layer through the communication unit 190, the lower layer higher-rank connection point reachability information updating unit 112 of the monitoring device 100 updates the lower layer higher-rank connection point reachability information database 150. In relation with the virtual network VPN_a, the lower layer higher-rank connection point reachability information updating unit 112 of the monitoring device 100E of the second layer receives the higher-rank connection point reachability information of CP1 to CP3 from the monitoring device 100A of the first layer and receives the higher-rank connection point reachability information of CP4 from the monitoring device 100B. In addition, in relation with the virtual network VPN_b, the lower layer higher-rank connection point reachability information updating unit 112 receives the higher-rank connection point reachability information of CP1 and CP2 from the monitoring device 100A and receives the higher-rank connection point reachability information of CP3 from the monitoring device 100B.

In this way, the lower layer higher-rank connection point reachability information updating unit 112 combines the higher-rank connection point reachability information received for each virtual network and updates the lower layer higher-rank connection point reachability information database 150.

FIGS. 10A and 10B are diagrams showing data configurations of the lower layer higher-rank connection point reachability information databases 150 of the monitoring device 100E of the second layer according to this embodiment. FIG. 10A is a diagram showing the lower layer higher-rank connection point reachability information database 150A relating to the virtual network VPN_a and includes information of the higher-rank connection point reachability information database 170A (see FIG. 7A) of the monitoring device 100A of the lower layer. FIG. 10B is a diagram showing the lower layer higher-rank connection point reachability information database 150B relating to the virtual network VPN_b and includes information of the higher-rank connection point reachability information database 170B (see FIG. 7B) of the monitoring device 100A of the lower layer.

Fault Detecting Process when Fault Occurs in Interface: Update of Adjacency Relation Information Database The adjacency relation information updating unit 113 of the monitoring device 100E updates the adjacency relation information database 160 relating to the network device 500 corresponding to the interface for which an operation has been updated in the interface information database 140B (see FIG. 9).

FIG. 11 is a diagram showing the data configuration of the adjacency relation information database 160C of the monitoring device 100E of the second layer according to this embodiment. As represented in the interface information database 140B (see FIG. 9), a physical link connecting the network devices 501 and 505 and a physical link connecting the network devices 502 and 505 are normal. For this reason, in the adjacency relation information database 160C (see FIG. 11), the adjacency relation between the network devices 501 and 505 and the adjacency relation between the network devices 501 and 505 are normal.

In this case, since there is no update of the interface information database 140B, the adjacency relation information updating unit 113 does not update the adjacency relation information database 160C.

Fault Detecting Process when Fault Occurs in Interface: Update of Higher-Rank Connection Point Reachability Information Database When the lower layer higher-rank connection point reachability information database 150 or the adjacency relation information database 160 is updated, the higher-rank connection point reachability information updating unit 114 of the monitoring device 100 updates the higher-rank connection point reachability information database 170.

FIGS. 12A and 12B are diagrams showing the data configurations of the higher-rank connection point reachability information databases 170C and 170D of the monitoring device 100E of the second layer according to this embodiment. FIG. 12A is a diagram showing the higher-rank connection point reachability information database 170C relating to the virtual network VPN_a. One record of the higher-rank connection point reachability information database 170C includes information of a user connection point 171, a higher-rank connection point 172 in the first layer, and a higher-rank connection point 173 in the second layer.

In the second layer, the higher-rank connection point is a network device 500 that connects areas (see FIG. 2). The higher-rank connection point reachability information database 170C has a structure acquired by adding attributes of the higher-rank connection point 173 in the second layer to the lower layer higher-rank connection point reachability information database 150A (see FIG. 10A). The higher-rank connection point reachability information updating unit 114 analyzes whether the higher-rank connection point 173 in the second layer can be reached from the higher-rank connection point 172 in the first layer by referring to the adjacency relation information database 160C (see FIG. 11) and updates the higher-rank connection point 173 in the second layer.

In FIG. 12A, for example, by referring to a record 178 for the user connection point CP3, the higher-rank connection point 172 in the first layer is the network device 501. By referring to the adjacency relation information database 160C (see FIG. 11), the network device 501 can reach a network device 502, which is a higher-rank connection point in the second layer, through the network device 505. Therefore, the higher-rank connection point 173 in the second layer of the record 178 becomes the network device 502.

In FIG. 12A, for the user connection point CP1, by referring to a record 177, there is no higher-rank connection point 172 in the first layer, and there is no higher-rank connection point 173 in the second layer. When the higher-rank connection point (the higher-rank connection point of the first layer) of the lower layer higher-rank connection point reachability information database 150A (see FIG. 10A) is updated with "null", the higher-rank connection point reachability information updating unit 114 updates the higher-rank connection point 172 in the first layer of the higher-rank connection point reachability information database 170C with "null" and updates the higher-rank connection point (the higher-rank connection point 173 in the second layer) with "null".

In addition, in a case in which the interface corresponding to the user connection point is recovered from the fault, and the higher-rank connection point of the lower layer higher-rank connection point reachability information database 150A is updated from "null" with a network device (connection point network device) that is a higher-rank connection point of the first layer, the higher-rank connection point reachability information updating unit 114 updates the higher-rank connection point 172 in the first layer of the higher-rank connection point reachability information database 170C with the network device. Furthermore, in a case in which it is determined that the higher-rank connection point of the second layer can be reached from the network device by referring to the adjacency relation information database 160C (see FIG. 11), the higher-rank connection point reachability information updating unit 114 updates the higher-rank connection point 173 with the higher-rank connection point of the second layer.

Fault Detecting Process when Fault Occurs in Interface: Update of Inter-Connection Point Reachability Information Database When the lower layer higher-rank connection point reachability information database 150 or the adjacency relation information database 160 is updated, the inter-connection point reachability information updating unit 115 of the monitoring device 100E analyzes the reachability between user connection points having different higher-rank connection points and updates the inter-connection point reachability information database 180.

FIGS. 13A and 13B are diagrams showing the data configurations of the inter-connection point reachability information databases 180C and 180D of the monitoring device 100E of the second layer according to this embodiment. FIG. 13A is a diagram showing the inter-connection point reachability information database 180C relating to the virtual network VPN_a. A pair of user connection points included in the inter-connection point reachability information database 180C is a pair of user connection points of which higher-rank connection points are different in the lower layer higher-rank connection point reachability information database 150A (see FIG. 10A) (the higher-rank connection points 172 (see FIG. 12A) of the first layer in the higher-rank connection point reachability information database 170C). The reachability of "CP1-CP4", "CP2-CP4", and "CP3-CP4" that are pairs of one of CP1 to CP3, of which the higher-rank connection points are the network device 501, and CP4 of which the higher-rank connection point is the network device 502 is included in the inter-connection point reachability information database 180C.

The inter-connection point reachability information updating unit 115 acquires higher-rank connection points of both user connection points by referring to the lower layer higher-rank connection point reachability information database 150 and determines the reachability between the user connection points of which the higher-rank connection points are different on the basis of presence/absence of the reachability between the two higher-rank connection points by referring to the adjacency relation information database 160. When there is reachability of both the user connection points for higher-rank connection points, and there is reachability between the two higher-rank connection points, there is reachability between both the user connection points. When there is no reachability of any one user connection point for a higher-rank connection point, or there is no reachability between the two higher-rank connection points, there is no reachability between the two user connection points.

In FIG. 10A, CP1 has no connectivity for a higher-rank connection point and, as shown in FIG. 13A, has no reachability for "CP1 to CP4".

Fault Detecting Process when Fault Occurs in Interface: Notification to Upper Layer When the higher-rank connection point reachability information database 170 or the inter-connection point reachability information database 180 is updated, the upper-layer notification nit 116 of the monitoring device 100E transmits the data of the higher-rank connection point reachability information database 170 and the inter-connection point reachability information database 180 to the monitoring device 100G of the third layer which has a higher rank.

As above, the process of the monitoring device 100E of the second layer in a case in which a fault occurs in the interface of the network device corresponding to the user connection point has been described. In addition, the monitoring device 100F similarly operates. Subsequently, the process of the monitoring device 100G of the third layer will be described.

Fault Detecting Process when Fault Occurs in Interface: Process of Monitoring Device of Third Layer FIG. 14 to FIG. 17B are diagrams respectively showing an interface information database 140C, lower layer higher-rank connection point reachability information databases 150C and 150D, an adjacency relation information database 160D, and inter-connection point reachability information databases 180E and 180F of the monitoring device 100G belonging to the third layer. In this embodiment, since the third layer is the uppermost layer, there is no higher-rank connection point reachability information database 170 (although the database is present, there is no record).

Fault Detecting Process when Fault Occurs in Interface: Update of Interface Information Database FIG. 14 is a diagram showing the data configuration of the interface information database 140C of the monitoring device 100G of the third layer according to this embodiment. The interface information database 140C stores an operation status of an interface to which a physical link connecting different areas is connected. For example, a record 147 represents that an interface "IF1/1/1" of the network device 503 is an interface to which a physical link connected to the network device 502 is connected and represents that the interface "IF1/1/1" is operating.

In this way, since an abnormality has not occurred in the interface connected to the network device, and an SNMP trap has not been received, the process of the interface information updating unit 111 of the monitoring device 100G is not executed.

Fault Detecting Process when Fault Occurs in Interface: Update of Lower Layer Higher-Rank Connection Point Reachability Information Database When higher-rank connection point reachability information is received from the monitoring device 100 of the lower layer through the communication unit 190, the lower layer higher-rank connection point reachability information updating unit 112 of the monitoring device 100 updates the lower layer higher-rank connection point reachability information database 150. In relation to the virtual network VPN_a, the lower layer higher-rank connection point reachability information updating unit 112 of the monitoring device 100G of the third layer receives the higher-rank connection point reachability information of CP1 to CP4 from the monitoring device 100E of the second layer and receives the higher-rank connection point reachability information of CP5 from the monitoring device 100F. In addition, in relation to the virtual network VPN_b, the lower layer higher-rank connection point reachability information updating unit 112 receives the higher-rank connection point reachability information of CP1 to CP3 from the monitoring device 100E and receives the higher-rank connection point reachability information of CP4 from the monitoring device 100F.

In this way, the lower layer higher-rank connection point reachability information updating unit 112 combines the higher-rank connection point reachability information received for each virtual network and updates the lower layer higher-rank connection point reachability information database 150.

FIGS. 15A and 15B are diagrams showing the data configurations of the lower layer higher-rank connection point reachability information database 150 of the monitoring device 100G of the third layer according to this embodiment. FIG. 15A is a diagram showing the lower layer higher-rank connection point reachability information database 150C relating to the virtual network VPN_a and includes information of the higher-rank connection point reachability information database 170C (see FIG. 12A) of the monitoring device 100E of the lower layer. FIG. 15B is a diagram showing the lower layer higher-rank connection point reachability information database 150D relating to the virtual network VPN_b and includes information of the higher-rank connection point reachability information database 170D (see FIG. 12B) of the monitoring device 100E of the lower layer.

Fault Detecting Process when Fault Occurs in Interface: Update of Adjacency Relation Information Database The adjacency relation information updating unit 113 of the monitoring device 100G updates the adjacency relation information database 160 relating to the network device 500 corresponding to the interface of which the operation has been updated in the interface information database 140C (see FIG. 14).

FIG. 16 is a diagram showing the data configuration of the adjacency relation information database 160D of the monitoring device 100G of the third layer according to this embodiment. As shown in the interface information database 140C (see FIG. 14), a physical link connecting the network devices 502 and 503 is normal. For this reason, the adjacency relation between the network devices 502 and 503 is normal in the adjacency relation information database 160D (see FIG. 16).

In this way, since there is no update of the interface information database 140C, the adjacency relation information updating unit 113 does not update the adjacency relation information database 160D.

Fault Detecting Processing when Fault Occur in Interface: Update of Higher-Rank Connection Point Reachability Information Database The third layer is the uppermost layer, and there is no higher-rank connection point reachability information database 170, and the higher-rank connection point reachability information updating unit 114 of the monitoring device 100G of the third layer does not update the higher-rank connection point reachability information database 170.

Fault Detecting Process when Fault Occurs in Interface: Update of Inter-Connection Point Reachability Information Database When the lower layer higher-rank connection point reachability information database 150 or the adjacency relation information database 160 is updated, the inter-connection point reachability information updating unit 115 of the monitoring device 100G analyzes the reachability between user connection points of which higher-rank connection points are different, and updates the inter-connection point reachability information database 180.

FIGS. 17A and 17B are diagrams showing the data configurations of the inter-connection point reachability information database 180 of the monitoring device 100G of the third layer according to this embodiment. FIG. 17A is a diagram showing an inter-connection point reachability information database 180E relating to the virtual network VPN_a. A pair of user connection points included in the inter-connection point reachability information database 180E is a pair of user connection points of which higher-rank connection points are different in the lower layer higher-rank connection point reachability information database 150C (see FIG. 15A). The reachability between "CP1-CP5", "CP2-CP5", "CP3-CP5", and "CP4-CP5" that are pairs of one of CP1 to CP4 of which the higher-rank connection points are network devices 502 and CP5 of which the higher-rank connection point is a network device 503 is included in the inter-connection point reachability information database 180E.

The reachability between the user connection points of which higher-rank connection points are different is similar to that of the monitoring device 100 of the second layer. In FIG. 15A, CP1 has no connectivity to a higher-rank connection point, and, as shown in FIG. 17A, there is no reachability between "CP1-CP5".

Fault Detecting Process when Fault Occurs in Interface: Notification to Upper Layer When the higher-rank connection point reachability information database 170 or the inter-connection point reachability information database 180 is updated, the upper-layer notification unit 116 of the monitoring device 100G transmits data of the higher-rank connection point reachability information database 170 to a monitoring terminal (not shown) of a network monitoring person.

As above, the process of the monitoring device 100G of the third layer in a case in which a fault has occurred in the interface of a network device corresponding to a user connection point has been described. Next, an overview of the operation of the network fault monitoring system 10 in a case in which a fault has occurred in a physical link connecting network devices will be described.

Fault Detecting Process when Fault Occurs in Physical Link

An operation of the network fault monitoring system 10 in a case in which a fault has occurred in a physical link connecting network devices 501 and 505 will be described with reference to FIG. 18 to FIG. 26B.

Since there is no change in the operation of the interface corresponding to the user connection point, there is no change in the database relating to the first layer. For this reason, there is no process performed by the monitoring devices 100A to 100D of the first layer.

Fault Detecting Process when Fault Occurs in Physical Link: Process of Second Layer Monitoring Device FIG. 18 to FIG. 22B respectively show an interface information database 140D, lower layer higher-rank connection point reachability information databases 150E and 150F, an adjacency relation information database 160E, higher-rank connection point reachability information databases 170E and 170F, and inter-connection point reachability information databases 180G and 180H of the monitoring device 100E belonging to the second layer.

Fault Detecting Process when Fault Occurs in Physical Link: Update of Interface Information Database When a fault occurs in a physical link, an occurrence of an abnormality in an interface to which the physical link is connected is detected, and the network device 500 notifies the monitoring device 100 using an SNMP trap. When the notification is received through the communication unit 190, the interface information updating unit 111 of the monitoring device 100, among records of the interface information database 140, changes the operation of a record corresponding to an interface number of the interface in which the fault has occurred to "DOWN".

FIG. 18 is a diagram showing the data configuration of an interface information database 140D of the monitoring device 100E of the second layer according to this embodiment. An interface "IF1/0/1" of the network device 501 and an interface "IF0/0/1" of the network device 505 connected to the physical link connecting the network devices 501 and 505 are updated from "UP" with "DOWN".

Fault Detecting Processing when Fault Occur in Physical Link: Update of Lower Layer Higher-Rank Connection Point Reachability Information Database When the higher-rank connection point reachability information is received from the monitoring device 100E of the layer through the communication unit 190, the lower layer higher-rank connection point reachability information updating unit 112 of the monitoring device 100 updates the lower layer higher-rank connection point reachability information database 150.

FIGS. 19A and 19B are diagrams showing the data configurations of lower layer higher-rank connection point reachability information databases 150 of the monitoring device 100E of the second layer according to this embodiment. FIG. 19A is a diagram showing a lower layer higher-rank connection point reachability information database 150E relating to the virtual network VPN_a. FIG. 19B is a diagram showing a lower layer higher-rank connection point reachability information database 150F relating to the virtual network VPN_b.

As described above, since there is no change in the operation of the interface corresponding to the user connection point, there is no change in the database relating to the first layer. For this reason, the lower layer higher-rank connection point reachability information updating unit 112 does not receive higher-rank connection point reachability information from the monitoring device 100 of the first layer that is a lower layer, and the lower layer higher-rank connection point reachability information databases 150E and 150F representing the higher-rank connection point reachability information of the first layer are not updated.

Fault Detecting Process when Fault Occurs in Physical Link: Update of Adjacency Relation Information Database The adjacency relation information updating unit 113 of the monitoring device 100E updates the adjacency relation information database 160 relating to a network device 500 corresponding to the interface of which the operation has been updated in the interface information database 140D (see FIG. 18).

FIG. 20 is a diagram showing the data configuration of the adjacency relation information database 160E of the monitoring device 100E of the second layer according to this embodiment. As shown in the interface information database 140D (see FIG. 18), a fault has occurred in an interface connected to a physical link connecting the network devices 501 and 505, and, as shown in FIG. 20, adjacency relation between the network devices 501 and 505 is lost and is updated from "1" to "0".

Fault Detecting Processing when Fault Occurs in Physical Link: Update of Higher-Rank Connection Point Reachability Information Database When the lower layer higher-rank connection point reachability information database 150 or the adjacency relation information database 160 is updated, the higher-rank connection point reachability information updating unit 114 of the monitoring device 100 updates the higher-rank connection point reachability information database 170.

FIGS. 21A and 21B are diagrams showing the data configurations of higher-rank connection point reachability information databases 170 of the monitoring device 100E of the second layer according to this embodiment. FIG. 21A is a diagram showing a higher-rank connection point reachability information database 170E relating to the virtual network VPN_a. A higher-rank connection point of monitoring device 100E of the second layer is the network device 502, and the higher-rank connection point reachability information updating unit 114 analyzes reachability from the higher-rank connection point 172 in the first layer to the higher-rank connection point 173 in the second layer in FIG. 21A by referring to the adjacency relation information database 160E (see FIG. 20) and updates the higher-rank connection point 173 of the second layer.

Here, a fault has occurred in a physical link between the network devices 501 and 505, and the reachability between the network devices 501 and 502 is lost. Accordingly, the reachability of the user connection points CP1 to CP3 for the higher-rank connection points is lost in a record in which the value of "the higher-rank connection point 172 in the first layer" is the "network device 501", and the value of "the higher-rank connection point 173 in the second layer" is updated from "N502" representing the network device 502 with "null".

In addition, when the fault in the physical link is recovered, and the higher-rank connection point 173 in the second layer becomes reachable from the higher-rank connection point 172 in the first layer, the higher-rank connection point reachability information updating unit 114 updates the value of the higher-rank connection point 173 in the second layer with the network device that is the higher-rank connection point of the second layer.

Fault Detecting Process when Fault Occurs in Physical Link: Update of Inter-Connection Point Reachability Information Database When the lower layer higher-rank connection point reachability information database 150 or the adjacency relation information database 160 is updated, the inter-connection point reachability information updating unit 115 of the monitoring device 100E analyzes the reachability between user connection points of which higher-rank connection points are different and updates the inter-connection point reachability information database 180.

FIGS. 22A and 22B are diagrams showing the data configurations of inter-connection point reachability information databases 180 of the monitoring device 100E of the second layer according to this embodiment. FIG. 22A is a diagram showing the inter-connection point reachability information database 180G relating to the virtual network VPN_a.

As represented in the adjacency relation information database 160E (see FIG. 20), the reachability between the network device 501 that is a higher-rank connection point of CP1 to CP3 and the network device 502 that is a higher-rank connection point of CP4 is lost, and the reachability between "CP1-CP4", "CP2-CP4", and "CP3-CP4" in FIG. 22A is lost.

The inter-connection point reachability information updating unit 115 changes the reachability between the pairs of user connection points corresponding to the two higher-rank connection points of the first layer between which the reachability has been lost in the inter-connection point reachability information database 180G to "NG" by referring to the adjacency relation information database 160E.

In addition, in a case in which the fault in the physical link is recovered, the reachability between a pair of user connection points corresponding to the two higher-rank connection points of the first layer between which the reachability has been restored is changed to "OK". Here, user connection points corresponding to the higher-rank connection point of the first layer can be acquired from the lower layer higher-rank connection point reachability information database 150 or the higher-rank connection point reachability information database 170.

Fault Detecting Process when Fault Occurs in Physical Link: Notification to Upper Layer When the higher-rank connection point reachability information database 170 or the inter-connection point reachability information database 180 is updated, the upper-layer notification unit 116 of the monitoring device 100E transmits data of the higher-rank connection point reachability information database 170 and the inter-connection point reachability information database 180 to the monitoring device 100G of the third layer of a higher rank.

As above, the process of the monitoring device 100E of the second layer in the case in which a fault has occurred in a physical link has been described. Subsequently, the process of the monitoring device 100G of the third layer will be described.

Fault Detecting Process when Fault Occurs in Physical Link: Process of Monitoring Device of Third Layer FIG. 23 to FIG. 26B are diagrams respectively showing an interface information database 140E, lower layer higher-rank connection point reachability information databases 150G and 150 H, an adjacency relation information database 160F, and an inter-connection point reachability information databases 180I and 180J of the monitoring device 100G belonging to the third layer.

Fault Detecting Process when a Fault Occurs in Physical Link: Update of Interface Information Database FIG. 23 is a diagram showing the data configuration of an interface information database 140E of the monitoring device 100G of the third layer according to this embodiment. As shown in the drawing, since no abnormality has occurred in an interface connected to a network device, and an SNMP trap has not been received, the process of the interface information updating unit 111 of the monitoring device 100G is not executed.

Fault Detecting Processing when Fault Occur in Physical Link: Update of Lower Layer Higher-Rank Connection Point Reachability Information Database When higher-rank connection point reachability information is received from the monitoring device 100 of the lower layer through the communication unit 190, the lower layer higher-rank connection point reachability information updating unit 112 of the monitoring device 100 updates the lower layer higher-rank connection point reachability information database 150. FIGS. 24A and 24B are diagrams showing the data configurations of a lower layer higher-rank connection point reachability information database 150 of a monitoring device 100G of the third layer according to this embodiment. FIG. 24A is a diagram showing a lower layer higher-rank connection point reachability information database 150G relating to the virtual network VPN_a. FIG. 24B is a diagram showing a lower layer higher-rank connection point reachability information database 150H relating to the virtual network VPN_b.

Fault Detecting Process when Fault Occurs in Physical Link: Update of Adjacency Relation Information Database.

The adjacency relation information updating unit 113 of the monitoring device 100G updates the adjacency relation information database 160 relating to a network device 500 corresponding to an interface of which the operation has been updated in the interface information database 140E (see FIG. 23).

FIG. 25 is a diagram showing the data configuration of the adjacency relation information database 160F of the monitoring device 100G of the third layer according to this embodiment. As represented in the interface information database 140E (see FIG. 23), a physical link connecting the network devices 502 and 503 remains normal and is not updated. For this reason, in the adjacency relation information database 160F (see FIG. 25), the adjacency relation between the network devices 502 and 503 remains normal without being updated.

Fault Detecting Process when Fault Occurs in Physical Link: Update of Higher-Rank Connection Point Reachability Information Database The third layer is the uppermost layer, and there is no higher-rank connection point reachability information database 170, and the higher-rank connection point reachability information updating unit 114 of the monitoring device 100G of the third layer does not update the higher-rank connection point reachability information database 170.

Fault Detecting Process when Fault Occurs in Physical Link: Update of Inter-Connection Point Reachability Information Database When the lower layer higher-rank connection point reachability information database 150 or the adjacency relation information database 160 is updated, the inter-connection point reachability information updating unit 115 of the monitoring device 100G analyzes the reachability between user connection points of which higher-rank connection points are different and updates the inter-connection point reachability information database 180.

FIGS. 26A and 26B are diagrams showing the data configurations of an inter-connection point reachability information database 180 of the monitoring device 100G of the third layer according to this embodiment. FIG. 26A is a diagram showing an inter-connection point reachability information database 180I relating to the virtual network VPN_a. In the lower layer higher-rank connection point reachability information database 150G (see FIG. 24A), CP1 to CP3 have no connectivity for a higher-rank connection point, and, as shown in FIG. 26A, there is no reachability between "CP1-CP5", "CP2-CP5", and "CP3-CP5".

Fault Detecting Process when Fault Occurs in Physical Link: Notification to Upper Layer When the inter-connection point reachability information database 180 is updated, the upper-layer notification unit 116 of the monitoring device 100G transmits information of the inter-connection point reachability information database 180 to a monitoring terminal (not shown) of a monitoring person of the network.

As above, the process of the monitoring device 100G of the third layer in a case in which a fault has occurred in the interface of a network device corresponding to the physical link has been described.

Up to this point, details of the process of the monitoring device 100 of each layer in a case in which a fault has occurred in an interface corresponding to a user connection point and a case in which a fault has occurred in a physical link between network devices have been described. Hereinafter, the process of the entire network fault monitoring system 10 will be described.

Figure 27:
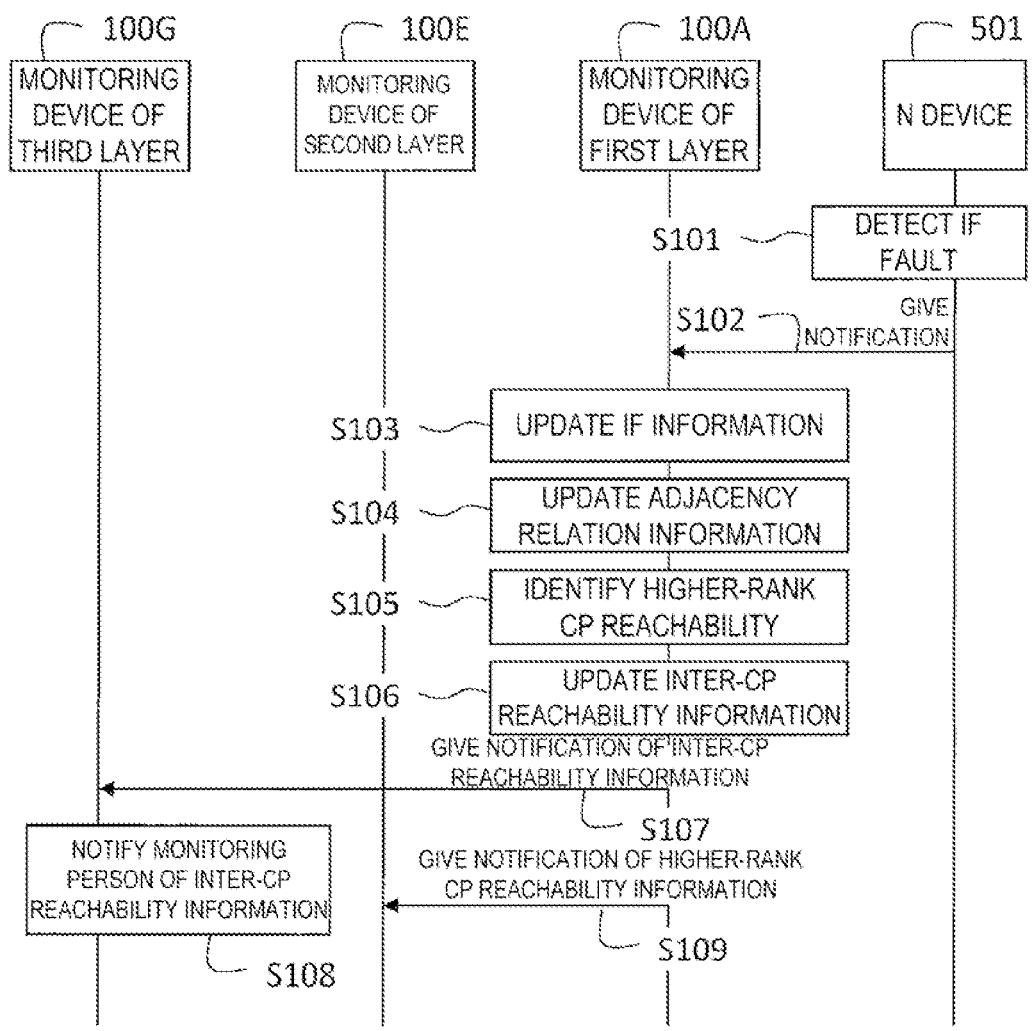
FIG. 27 is a sequence diagram (1) for describing a fault detecting process of a network fault monitoring system when a fault occurs in an interface corresponding to a user connection point according to this embodiment.
Figure 28:
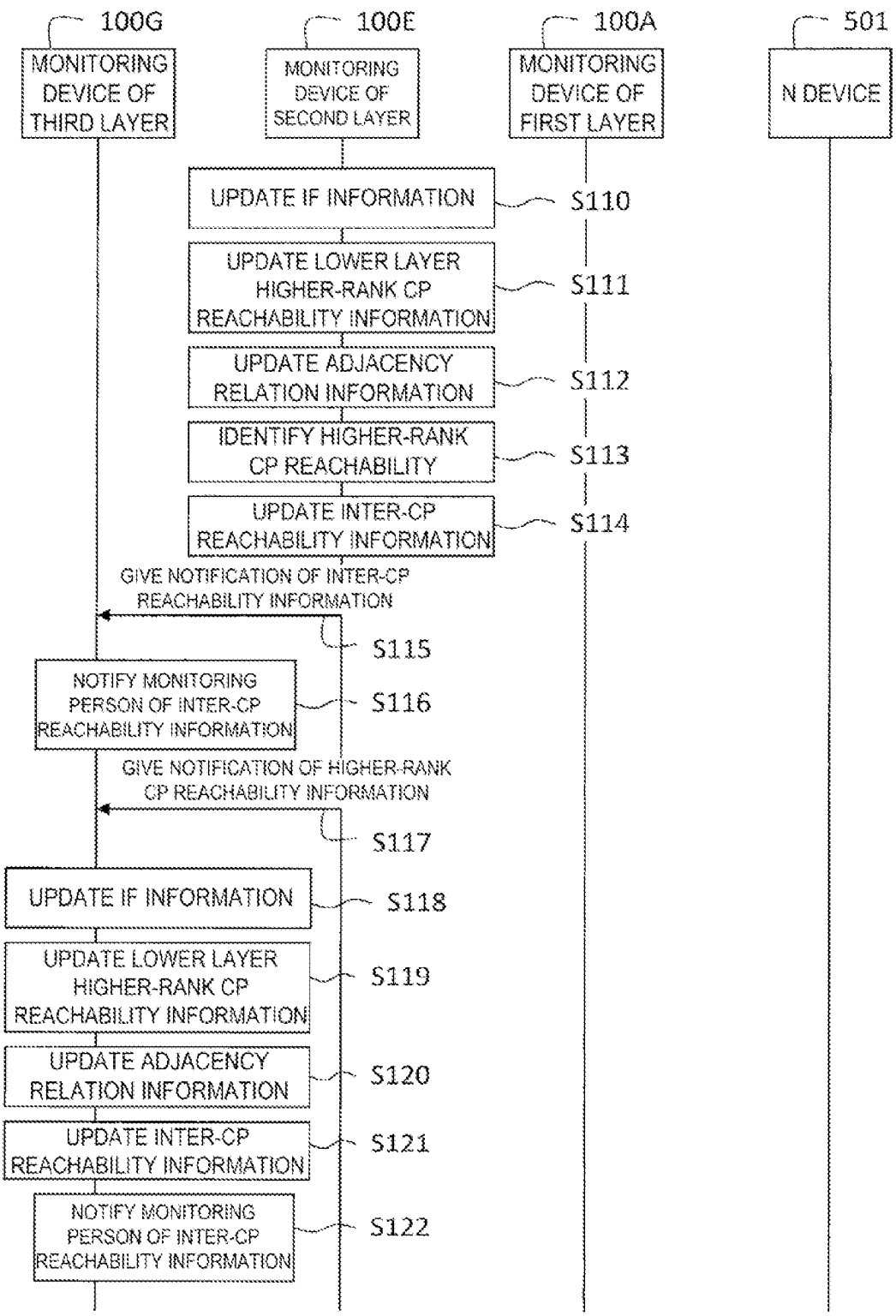
FIG. 28 is a sequence diagram (2) for describing a fault detecting process of a network fault monitoring system when a fault occurs in an interface corresponding to a user connection point according to this embodiment.

Fault Detecting Process of Network Fault Monitoring System when Fault Occur in Interface FIG. 27 and FIG. 28 are sequence diagrams for describing a fault detecting process of the network fault monitoring system 10 according to this embodiment when a fault occurs in an interface corresponding to a user connection point.

In step S101, the network device 501 detects that a fault has occurred in an interface corresponding to the user connection point.

In step S102, the network device 501 notifies first layer monitoring device 100A of the interface fault.

In step S103, the interface information updating unit 111 of the first layer of the monitoring device 100A updates the operation status of the record of the interface that was in the notification in the record of interface information database 140A (see FIG. 5).

In step S104, the adjacency relation information updating unit 113 of the monitoring device 100A updates the adjacency relation information database 160A and 160B (see FIGS. 6A and 6B). Specifically, the adjacency relation information updating unit 113 updates the reachability with the higher-rank connection point of the user connection point corresponding to the updated interface in step S103.

In step S105, the higher-rank connection point reachability information updating unit 114 of the monitoring device 100A updates the higher-rank connection point reachability information database 170A and 170B (see FIGS. 7A and 7B). Specifically, the higher-rank connection point reachability information updating unit 114 updates the higher-rank connection point of the updated user connection point in step S104.

In step S106, the inter-connection point reachability information updating unit 115 of the monitoring device 100A updates the inter-connection point reachability information databases 180A and 180B (see FIGS. 8A and 8B). More specifically, the inter-connection point reachability information updating unit 115 updates the reachability of a pair of user connection points including the user connection point updated in step S104.

In step S107, the upper-layer notification unit 116 of the monitoring device 100A transmits data of the inter-connection point reachability information databases 180A and 180B to the monitoring device 100G of the third layer that the uppermost layer.

In step S108, the upper-layer notification unit 116 of the monitoring device 100G of the third layer transmits data of the received inter-connection point reachability information databases 180A and 180B to a monitoring terminal of a monitoring person. In step S109, the monitoring device 100A transmits data of the higher-rank connection point reachability information databases 170A and 170B to a monitoring device 100E of the second layer of a higher rank.

Referring to FIG. 28, in a case in which a notification of the operation status of the interface is received in step S110, the interface information updating unit 111 of the monitoring device 100E of the second layer updates the operation status of the record of the interface included in the notification among records of the interface information database 140B (see FIG. 9). Here, since no notification has been received, the interface information updating unit 111 does not update the interface information database 140.

In step S111, the lower layer higher-rank connection point reachability information updating unit 112 of the monitoring device 100E updates the lower layer higher-rank connection point reachability information databases 150A and 150B (see FIGS. 10A and 10B) on the basis of the higher-rank connection point reachability information of the first layer received in step S109.

In step S112, the adjacency relation information updating unit 113 of the monitoring device 100E updates the adjacency relation information database 160C (see FIG. 11). In more detail, the adjacency relation information updating unit 113 updates the adjacency relation between the network devices corresponding to the interface updated in step S110. Here, in step S110, since there is no update, the adjacency relation information database 160C is not updated.

In step S113, the higher-rank connection point reachability information updating unit 114 of the monitoring device 100E updates the higher-rank connection point reachability information databases 170C and 170D (see FIGS. 12A and 12B). In more detail, the higher-rank connection point reachability information updating unit 114 updates the higher-rank connection point of the second layer relating to the user connection point updated in step S111. The adjacency relation information database 160C is not updated, and there is no update of the higher-rank connection point reachability information databases 170C and 170D accompanying the update of the adjacency relation information database 160C.

In step S114, the inter-connection point reachability information updating unit 115 of the monitoring device 100E updates the inter-connection point reachability information databases 180C and 180D (see FIGS. 13A and 13B). In more detail, the inter-connection point reachability information updating unit 115 updates the reachability of the pair of user connection points including the user connection point updated in step S111 or the reachability of a pair of user connection points including the user connection point having the connection point of the adjacency relation information database 160C updated in step S112 as its higher-rank connection point.

In step S115, the upper-layer notification unit 116 of the monitoring device 100E transmits data of the inter-connection point reachability information databases 180C and 180D to the monitoring device 100G of the uppermost layer.

In step S116, the monitoring device 100G of the third layer transmits data of the received inter-connection point reachability information databases 180C and 180D to a monitoring terminal of a monitoring person.

In step S117, the monitoring device 100E transmits data of the higher-rank connection point reachability information databases 170C and 170D to the monitoring device 100G of the third layer of a higher rank.

In step S118, in a case in which a notification of the operation status of the interface has been received, the interface information updating unit 111 of the monitoring device 100G of the third layer updates the operation status of a record of the interface included in the notification among records of the interface information database 140C (see FIG. 14). Here, since no notification has been received, the interface information updating unit 111 does not update the interface information database 140C.

In step S119, the lower layer higher-rank connection point reachability information updating unit 112 of the monitoring device 100G updates the lower layer higher-rank connection point reachability information databases 150C and 150D (see FIGS. 15A and 15B) on the basis of the higher-rank connection point reachability information of the second layer received in step S117.

In step S120, the adjacency relation information updating unit 113 of the monitoring device 100G updates the adjacency relation information database 160D (see FIG. 16). More specifically, the adjacency relation information updating unit 113 updates adjacency relation between network devices corresponding to the interface updated in step S118. Here, in step S118, since there is no update, the adjacency relation information database 160D is not updated.

In step S121, the inter-connection point reachability information updating unit 115 of the monitoring device 100G updates the inter-connection point reachability information databases 180E and 180F (see FIGS. 17A and 17B). More specifically, the inter-connection point reachability information updating unit 115 updates the reachability of a pair of user connection points including the user connection point updated in step S119 or the reachability of a pair of user connection points including the user connection point having the connection point of the adjacency relation information database 160D updated in step S120 as its higher-rank connection point.

In step S122, the monitoring device 100G transmits data of the inter-connection point reachability information databases 180E and 180F to a monitoring terminal of a monitoring person.

As above, the fault detecting process of the network fault monitoring system 10 in a case in which a fault has occurred in an interface corresponding to the user connection point has been described. Subsequently, the fault detecting process of the network fault monitoring system 10 in the case in which a fault has occurred in a physical link between network devices will be described.

Figure 29:
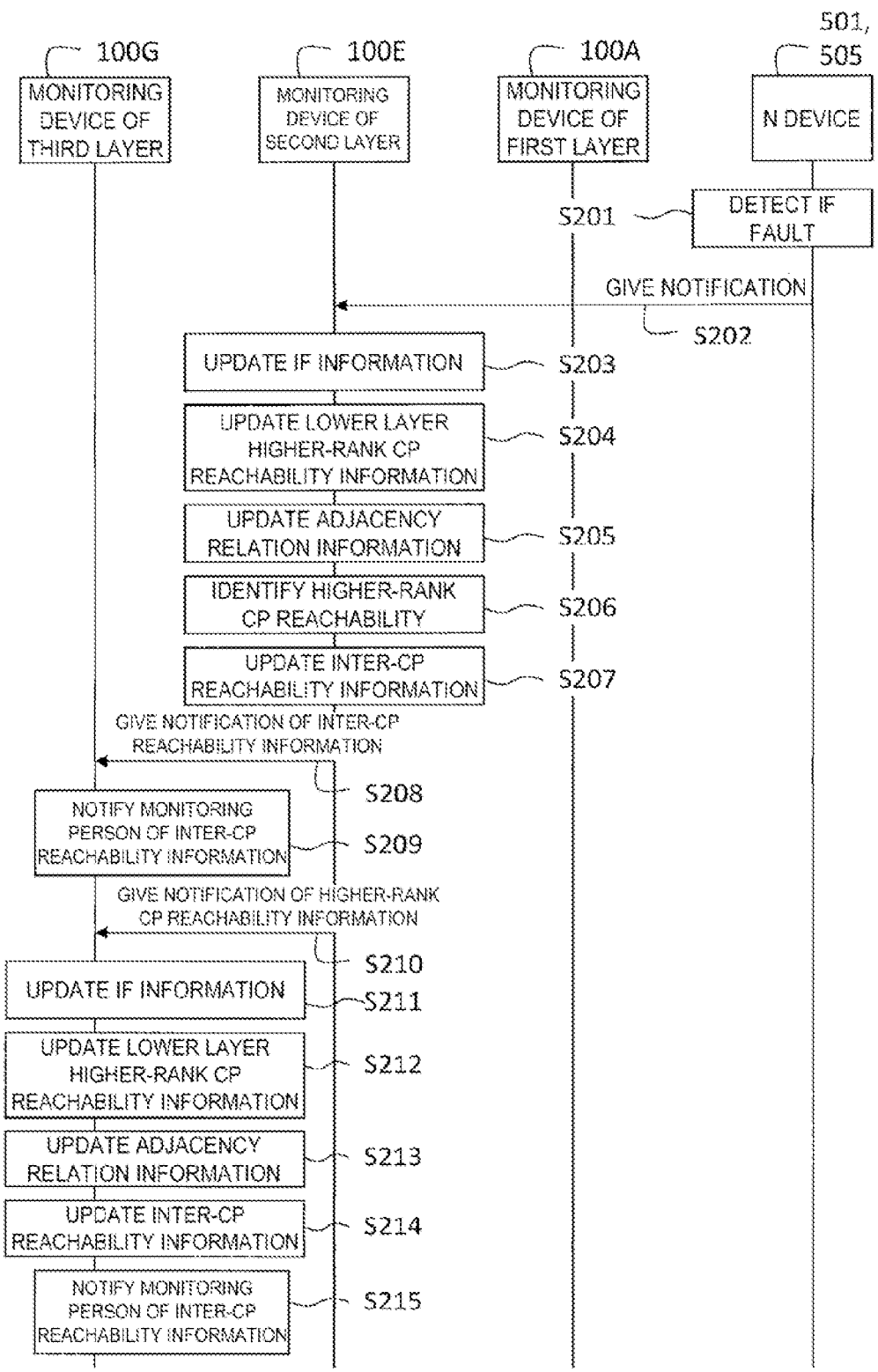
FIG. 29 is a sequence diagram for describing a fault detecting process of a network fault monitoring system when a fault occurs in an interface corresponding to a physical link between network devices according to this embodiment.

Fault Detecting Process of Network Fault Monitoring System when Fault Occurs in Physical Link FIG. 29 is a sequence diagram showing the fault detecting process of the network fault monitoring system 10 according to this embodiment when a fault has occurred in an interface corresponding to a physical link between network devices 501 and 505.

In step S201, a fault occurs in the physical link, and the network devices 501 and 505 detect an occurrence of a fault in the interface to which the physical link is connected. In step S202, the network devices 501 and 505 notify the monitoring device 100E of the second layer of the fault in the interface.

In step S203, when a notification of the operation status of the interface is received, the interface information updating unit 111 of the monitoring device 100E of the second layer updates the operation status of a record of an interface included in the notification among records of the interface information database 140D (see FIG. 18).

In step S204, the lower layer higher-rank connection point reachability information updating unit 112 of the monitoring device 100E updates the lower layer higher-rank connection point reachability information databases 150E and 150F (see FIGS. 19A and 19B) on the basis of the higher-rank connection point reachability information of the first layer received from the monitoring device 100 of the lower layer. Here, the higher-rank connection point reachability information of the first layer has not been received, and the corresponding databases are not updated.

In step S205, the adjacency relation information updating unit 113 of the monitoring device 100E updates the adjacency relation information database 160E (see FIG. 20). More specifically, the adjacency relation information updating unit 113 updates the adjacency relation between the network devices 501 and 505 corresponding to the interface updated in step S203.

In step S206, the higher-rank connection point reachability information updating unit 114 of the monitoring device 100E updates the higher-rank connection point reachability information databases 170E and 170F (see FIGS. 21A and 21B). More specifically, the higher-rank connection point reachability information updating unit 114 updates the higher-rank connection point 173 of the second layer relating to the user connection point updated in step S204 or the user connection point having the connection point of the adjacency relation information database 160E updated in step S205 as its higher-rank connection point.

In step S207, the inter-connection point reachability information updating unit 115 of the monitoring device 100E updates the inter-connection point reachability information databases 180G and 180H (see FIGS. 22A and 22B). In more detail, the inter-connection point reachability information updating unit 115 updates the reachability of a pair of user connection points including the user connection point updated in step S204 or the reachability of a pair of user connection points including the user connection point having the connection point of the adjacency relation information database 160C updated in step S205 as its higher-rank connection point.

In step S208, the upper-layer notification unit 116 of the monitoring device 100E transmits data of the inter-connection point reachability information databases 180G and 180H to the monitoring device 100G of the uppermost layer.

In step S209, the monitoring device 100G of the third layer transmits data of the received inter-connection point reachability information databases 180G and 180H to a monitoring terminal of a monitoring person.

In step S210, the monitoring device 100E transmits data of the higher-rank connection point reachability information databases 170E and 170F to the monitoring device 100G of the third layer of a higher rank.

In step S211, in a case in which a notification of the operation status of the interface has been received, the, interface information updating unit 111 of the monitoring device 100G of the third layer updates the operation status of the record of the interface included in the notification among records of the interface information database 140E (see FIG. 23). Here, since no notification has been received, the interface information updating unit 111 does not update the interface information database 140E.

In step S212, the lower layer higher-rank connection point reachability information updating unit 112 of the monitoring device 100G updates the lower layer higher-rank connection point reachability information databases 150G and 150H (see FIGS. 24A and 24B) on the basis of the higher-rank connection point reachability information of the second layer received in step S210.

In step S213, the adjacency relation information updating unit 113 of the monitoring device 100G updates the adjacency relation information database 160F (see FIG. 25). In more detail, the adjacency relation information updating unit 113 updates the adjacency relation between network devices corresponding to the interface updated in step S211. Here, in step S211, since there is no update, the adjacency relation information database 160F is not updated.

In step S214, the inter-connection point reachability information updating unit 115 of the monitoring device 100G updates the inter-connection point reachability information databases 180I and 180J (see FIGS. 26A and 26B). In more detail, the inter-connection point reachability information updating unit 115 updates the reachability of as pair of user connection points including the user connection point updated in step S212 or the reachability of a pair of user connection points including the user connection point having the connection point of the adjacency relation information database 160F updated in step S213 as its higher-rank connection point.

In step S215, the monitoring device 100G transmits data of the inter-connection point reachability information databases 180I and 180J to a monitoring terminal of a monitoring person.

As above, the fault detecting process of the network fault monitoring system 10 in the case in which a fault has occurred in a physical link corresponding to a user connection point has been described. Up to this point, update in which a fault has occurred, and the operation of the interface is set to "DOWN", the adjacency relation is set to "0", the higher-rank connection point is set to "null", or the reachability between user connection points is set to "NG" has been described. In a case in which the interface or the physical link is recovered, such updates are updated to normal states such as "UP", "1", the identification information of a network device of a higher-rank connection point, and "OK".

Feature of Fault Detecting Process of Network Fault Monitoring System

A monitoring target is divided and hierarchized as network devices, areas, and the entire network in the case of a network as the monitoring target. Then, the monitoring device 100 analyzes which reachability between certain user connection points has been lost by being triggered upon detection of a fault in the interface and notifies of a monitoring terminal of a monitoring person of a result of the analysis.

The monitoring device 100 of the first layer receives a notification of a fault in the interface corresponding to the user connection point, and the interface information updating unit 111 of the first layer updates an operation status of an interface corresponding to the interface information database 140 of the first layer. Next, the adjacency relation information updating unit 113 of the first layer updates the adjacency relation between user connection points corresponding to the updated interface in the interface information database 140 of the first layer in the adjacency relation information database 160.

Subsequently, when the adjacency relation information database 160 of the first layer is updated, the higher-rank connection point reachability information updating unit 114 of the first layer updates the higher-rank connection point of the user connection point updated in the adjacency relation information database 160 of the first layer in the higher-rank connection point reachability information database 170 of the first layer. In addition, the inter-connection point reachability information updating unit 115 of the first layer updates the reachability of a pair of user connection points including the user connection point updated in the adjacency relation information database 160 of the first layer in the inter-connection point reachability information database 180 of the first layer.

In addition, the upper-layer notification unit 116 of the first layer notifies the monitoring device of the uppermost layer of information of the updated inter-connection point reachability information database 180 of the first layer. Furthermore, the upper-layer notification unit 116 of the first layer notifies the monitoring device of the second layer, which is an upper layer, of information of the updated higher-rank connection point reachability information database 170 of the first layer (the higher-rank connection point reachability information).

In the monitoring device 100 of the N-th layer (here, N≥2) of a higher rank than the first layer receives a notification of a fault in the interface to which a physical link between network devices belonging to the N-th layer is connected, and the interface information updating unit 111 of the N-th layer updates the operation status of a corresponding interface of the interface information database 140 of the N-th layer. Furthermore, when higher-rank connection point reachability information (the information of the higher-rank connection point reachability information database 170 of the (N−1)-th layer) is received from the monitoring device of the lower layer (the (N−1)-th layer), the lower layer higher-rank connection point reachability information updating unit 112 of the N-th layer updates the lower layer higher-rank connection point reachability information database 150 of the N-th layer.

Next, the adjacency relation information updating unit 113 of the N-th layer updates the adjacency relation between network devices corresponding to the interface updated in the interface information database 140 of the N-th layer in the adjacency relation information database 160 of the N-th layer.

Subsequently, when the adjacency relation information database 160 of the N-th layer is updated, the higher-rank connection point reachability information updating unit 114 of the N-th layer changes a higher-rank connection point of the user connection point having a network device of which reachability for the higher-rank connection point of the N-th layer is lost as a higher-rank connection point in the lower layer higher-rank connection point reachability information database 150 of the N-th layer (a higher-rank connection point of the (N−1)-th layer in the higher-rank connection point reachability information database 170 of the N-th layer) by referring to the adjacency relation information database 160 of the N-th layer in the higher-rank connection point reachability information database 170 of the N-th layer (see the network device 501 in FIGS. 20 and 21).

In more detail, when the value of the higher-rank connection point of the (N−1)-th layer is "null", the higher-rank connection point reachability information updating unit 114 of the N-th layer updates the value of the higher-rank connection point of the N-th layer with "null". Furthermore, when the value of the higher-rank connection point of the (N−1)-th layer is a network device, in a case in which the network device and a network device that is a higher-rank connection point of the N-th layer can be reached from each other, the higher-rank connection point reachability information updating unit 114 of the N-th layer updates the value of the higher-rank connection point of the N-th layer with a network device that is a higher-rank connection point of the N-th layer.

In addition, when the lower layer higher-rank connection point reachability information database 150 of the N-th layer is updated, the higher-rank connection point reachability information updating unit 114 of the N-th layer updates the user connection point changed in the lower layer higher-rank connection point reachability information database 150 of the N-th layer in the higher-rank connection point reachability information database 170 of the N-th layer (see CP1 in FIGS. 10A and 12A).

Furthermore, when the lower layer higher-rank connection point reachability information database 150 of the N-th layer is updated, the inter-connection point reachability information updating unit 115 of the N-th layer updates the reachability of a pair of user connection points including the user connection point changed in the lower layer higher-rank connection point reachability information database 150 of the N-th layer in the inter-connection point reachability information database 180 of the N-th layer (see CP1 in FIGS. 10A and 13A).

In addition, when the adjacency relation information database 160 of the N-th layer is updated, the inter-connection point reachability information updating unit 115 of the N-th layer updates the reachability of a pair of user connection points having a network device of which the reachability has been lost as a higher-rank connection point in the lower layer higher-rank connection point reachability information database 150 of the N-th layer by referring to the adjacency relation information database 160 of the N-th layer in the inter-connection point reachability information database 180 of the N-th layer (in FIG. 20, as a result of adjacency relation between the network devices 501 and 505 being lost, the reachability between the network devices 501 and 502 is lost, and see pairs of user connection points in FIG. 22A having network devices 501 and 502 in FIG. 19A as higher-rank connection points of the first layer (CP1-CP4, CP2-CP4, and CP3-CP4)).

Subsequently, the upper-layer notification unit 116 of the N-th layer notifies the monitoring device of the uppermost layer of information of the updated inter-connection point reachability information database 180 of the N-th layer. In addition, the upper-layer notification unit 116 of the N-th layer notifies the monitoring device of the upper layer (the (N+1)-th layer) of information of the updated higher-rank connection point reachability information database 170 of the N-th layer.

In a case in which the N-th layer is the uppermost layer, in the monitoring device of the N-th layer, the upper-layer notification unit 116 of the N-th layer notifies a monitoring terminal of a monitoring person of the information of the inter-connection point reachability information databases 180 received from the monitoring device of the lower layers (the first layer to the (N−1)-th layer) and the updated information in the inter-connection point reachability information database 180 of the N-th layer.

Effect of Fault Detecting Process of Network Fault Monitoring System

In this way, the network fault monitoring system can decrease the number of pairs of user connection points that are detection targets of one monitoring device by detecting the loss of reachability between user connection points in each layer, and pairs of user connection points influenced by the fault can be identified at a high speed and can be notified to a monitoring person. In addition, the network monitoring person can quickly identify users influenced by the fault and users not influenced by the fault, and accordingly, the reliability and user services such as swift handling after the occurrence of an fault, a notification of malfunction information only to users influenced by the fault, and the like can be improved.

Since the network fault monitoring system identifies pairs of user connection points influenced by the fault by being triggered upon a notification from a network device in which a fault has occurred in the interface, and accordingly, a monitoring signal does not need to be transmitted constantly, there is no suppression for the network bandwidth.

In addition, the network fault monitoring system identifies pairs of user connection points influenced by the fault using a standard function of the network device called notification of an interface fault. For this reason, a network fault monitoring method according to this embodiment can be applied to a network made up of network devices not equipped to perform mirroring of traffic and flow monitoring, and such a network can be monitored at a low cost.

Variation: Monitoring Device Corresponding to Plurality of Layers

A monitoring device of the second layer may have a user connection point. In such a case, the monitoring device receives a notification of a fault of an interface corresponding to the user connection point and a notification of a fault of an interface to which a physical link between network devices is connected. In addition, the monitoring device includes an interface information database 140, an adjacency relation information database 160, a higher-rank connection point reachability information database 170, and an inter-connection point reachability information database 180 corresponding to each of the first layer and the second layer. The interface information updating unit 111, the adjacency relation information updating unit 113, the higher-rank connection point reachability information updating unit 114, the inter-connection point reachability information updating unit 115, and the upper-layer notification unit 116 update respective databases of the first layer and the second layer. The description presented above can be similarly applied also to a monitoring device corresponding to a plurality of layers such as first and third layers or second and third layers.

Modified Example: Plurality of Higher-Rank Connection Points

In the description presented up to now, although there is one higher-rank connection point, there may be a plurality of higher-rank connection points. For example, in a case in which there are three areas including area 1, area 2, and area 3 as the second layer, area 1 and area 2 are connected, and area 2 and area 3 are connected, two connection points of area 2 may be different network devices (higher-rank connection points).

In a case in which there are a plurality of higher-rank connection points, a plurality of higher-rank connection points are included in the higher-rank connection points of the higher-rank connection point reachability information database 170, and presence/absence of reachability for each higher-rank connection point is included. In addition, the upper-layer notification unit 116 transmits reachability of one user connection point for a plurality of higher-rank connection points to the monitoring device of the upper layer.

Modified Example: Upper-Layer Notification Unit

The information of the higher-rank connection point reachability information database 170 and the inter-connection point reachability information database 180 transmitted to the monitoring device of the upper layer by the upper-layer notification unit 116 does not need to be the entire information, and configuration may be taken to transmit only updated information.

Modified Example: Integration of Control Unit

In the embodiment described above, (1) the interface information updating unit 111 receives a notification of a change in the operation status of the interface and updates the interface information database 140, (2) the lower layer higher-rank connection point reachability information updating unit 112 receives higher-rank connection point reachability information from the monitoring device of a lower layer and updates the lower layer higher-rank connection point reachability information database 150, (3) the adjacency relation information updating unit 113 updates the adjacency relation information database 160 by being triggered upon update of the interface information database 140, (4) the higher-rank connection point reachability information updating unit 114 updates the higher-rank connection point reachability information database 170 by being triggered upon update of the lower layer higher-rank connection point reachability information database 150 and the adjacency relation information database 160, and (5) the inter-connection point reachability information updating unit 115 updates the inter-connection point reachability information database 180 by being triggered upon update of the lower layer higher-rank connection point reachability information database 150 and the adjacency relation information database 160.

The higher-rank connection point reachability information updating unit 114 of the N-th layer (here, N≥2) may be configured to include functions of the interface information updating unit 111 of the N-th layer, the lower layer higher-rank connection point reachability information updating unit 112 of the N-th layer, and the adjacency relation information updating unit 113 of the N-th layer and, by being triggered upon reception of the operation status of the interface or the higher-rank connection point reachability information from the monitoring device of the (N−1)-th layer, may be configured to update the higher-rank connection point reachability information database 170 of the N-th layer without updating the interface information database 140 of the N-th layer, the lower layer higher-rank connection point reachability information database 150 of the N-th layer, and the adjacency relation information database 160 of the N-th layer. Similarly, the inter-connection point reachability information updating unit 115 of the N-th layer may be configured to update the inter-connection point reachability information database 180 of the N-th layer.

In such a case, the higher-rank connection point reachability information updating unit 114 of the N-th layer and the inter-connection point reachability information updating unit 115 of the N-th layer may update or refer to the higher-rank connection point reachability information database 170 of the N-th layer instead of updating and referring to the lower layer higher-rank connection point reachability information database 150 of the N-th layer.

Furthermore, the higher-rank connection point reachability information updating unit 114 and the inter-connection point reachability information updating unit 115 may be configured to be integrated. In more detail, the monitoring device 100 of the N-th layer (here, N≥2) that is an upper layer with respect to the first layer is configured to monitor a connection status between higher-rank connection points (connection point network devices) of areas or network devices (an aggregation or a network device that is a monitoring target is regarded as an aggregation formed from one element) that are monitoring targets of the (N−1)-th layer that become elements of a network or an area that is a monitoring target (an aggregation that is a monitoring target) by receiving a notification of a fault of an interface corresponding to a link connecting the higher-rank connection points. In addition, the monitoring device 100 of the N-th layer receives information of the higher-rank connection point reachability information database 170 (information of reachability from a user connection point to a higher-rank connection point of the (N−1)-th layer (a connection point network device of an aggregation of the (N−1)-th layer)) from the monitoring device of the (N−1)-th layer that is a lower layer. The inter-connection point reachability information database 180 may be updated by determining reachability between user connection points included in an aggregation that is a monitoring target of the (N−1)-th layer from this connection status and the information of the higher-rank connection point reachability information database.

In addition, integration of control units in the N-th layer described above may be similarly applied also to the first layer. In more detail, the higher-rank connection point reachability information updating unit 114 of the first layer or the inter-connection point reachability information updating unit 115 of the first layer may include the functions of the interface information updating unit 111 of the first layer, the lower layer higher-rank connection point reachability information updating unit 112 of the first layer, and the adjacency relation information updating unit 113 of the first layer. Furthermore, the higher-rank connection point reachability information updating unit 114 of the first layer and the inter-connection point reachability information updating unit 115 of the first layer may be integrated.

REFERENCE SIGNS LIST

100, 100A to 100G Monitoring Device
110 Control unit
111 Interface information updating unit
112 Lower layer higher-rank connection point reachability information updating unit
113 Adjacency relation information updating unit
114 Higher-rank connection point reachability information updating unit
115 Inter-connection point reachability information updating unit
116 Upper-layer notification unit
120 Storage unit
130, 130A Connection point—interface association information database
140, 140A to 140E Interface information database
150, 150A to 150H Lower layer higher-rank connection point reachability information database
160, 160A to 160F Adjacency relation information database
170, 170A to 170F Higher-rank connection point reachability information database
180, 180A to 180J Inter-connection point reachability information database
190 Communication unit
501 to 506 Network device

The invention claimed is:

1. A monitoring device operable to make up a part of a network fault monitoring system operable to monitor reachability between a user connection point and another user connection point of a plurality of user connection points in a virtual network built on a network having layers made up with aggregations of network devices, the user connection points representing connection points between the virtual network and a user side and being in the network devices,
wherein in a case in which a plurality of monitoring devices constitute a layer corresponding to a monitoring target layer of the aggregations of the network devices, and among the plurality of monitoring devices monitoring the aggregations of the network devices, the monitoring device belongs to an N-th layer that is an upper layer with respect to a first layer, the first layer being a lowermost layer among a plurality of the layers of the plurality of monitoring devices, the monitoring device determines reachability between the user connection point and the another connection point in different aggregations belonging to an (N−1)-th layer based on:
i) connection statuses between connection point network devices representing network devices connecting different aggregations belonging to the (N−1)-th layer, each of the different aggregations being an element of a monitoring target aggregation of the N-th layer, and
ii) information of reachability from the user connection point to the connection point network devices belonging to the aggregation of the (N−1)-th layer comprising the user connection point, the information of reachability being received from the monitoring devices belonging to a lower layer, and wherein when a change occurs in a connection status between the connection point network devices representing network devices connecting the aggregations of the (N−1)-th layer, a higher-rank connection point reachability information database of the N-th layer is updated such that the higher-rank connection point of the N-th layer of a user connection point whose higher-rank connection point of the (N−1)-th layer is one of the connection point network devices having changed reachability for the higher-rank connection point of the N-th layer in accordance with the change in the connection status is updated to a) "none" in a case in which reachability between the higher-rank connection point of the (N−1)-th layer and the higher-rank connection point of the N-th layer is "present",
b) "none" in a case in which the reachability between the higher-rank connection point of the (N−1)-th layer and the higher-rank connection point of the N-th layer is "absent",
c) "none" in a case in which a value of the higher-rank connection point of the (N−1)-th layer changes to "none", or
d) the higher-rank connection point of the N-th layer that can be reached from the one of the connection point network devices, in a case in which a value of the higher-rank connection point of the (N−1)-th layer changes from "none" to the connection point network device becoming the higher-rank connection point of the (N−1)-th layer, when a change in a connection status between the connection point network devices occurs, an inter-connection point reachability information database of the N-th layer is updated, such that the reachability between a pair of user connection points whose higher-rank connection points of the (N−1)-th layer are the connection point network devices having changed reachability in accordance with the change in the connection status between connection point network devices is updated in accordance with the change in the connection status between the connection point network devices, when a change occurs in the reachability between one of the connection point network devices and one of the higher-rank connection points of the (N−1)-th layer corresponding to the user connection point, the reachability between a pair of user connection points comprising the user connection point corresponding to the higher-rank connection points of the (N−1)-th layer having the change in accordance with the reachability between the higher-rank connection points of the (N−1)-th layers of the pair of user connection points or the reachability between each of the higher-rank connection points of the (N−1)-th layers of the pair of user connection points and each of the pair of user connection points is updated, and when the N-th layer is a layer lower than an uppermost layer, updated information of the higher-rank connection point reachability information database of the N-th layer to a monitoring device of an upper layer with respect to the N-th layer is transmitted.

2. A monitoring device operable to make up a part of a network fault monitoring system operable to monitor reachability between a user connection point and another user connection point of a plurality of user connection points in a virtual network built on a network having layers made up with aggregations of network devices, the user connection points representing connection points between the virtual network and a user side and being in the network devices, wherein in a case in which a plurality of monitoring devices constitute a layer corresponding to a monitoring target layer of the aggregations of the network devices, and among the plurality of monitoring devices monitoring the aggregations of the network devices, the monitoring device belongs to an N-th layer that is an upper layer with respect to a first layer, the first layer being a lowermost layer among a plurality of layers of the plurality of monitoring devices, the monitoring device comprises:

(i) a memory device, implementing one or more processors, configured to store:
  a higher-rank connection point reachability information database of an N-th layer storing (N+1) items in association with each other; and
  an inter-connection point reachability information database of the N-th layer storing a pair of user connection points of which higher-rank connection points of an (N−1)-th layer are different in the higher-rank connection point reachability information database of the N-th layer and reachability of the pair of user connection points in association with each other, wherein the (N+1) items comprising the user connection point and higher-rank connection points from a higher-rank connection point of the first layer to a higher-rank connection point of the N-th layer, the higher-rank connection point of the first layer representing a network device that can be reached from the user connection point and being comprised in a monitoring target aggregation of the first layer, and the higher-rank connection point of the N-th layer representing a network device that can be reached from the user connection point and connecting a monitoring target aggregation of the N-th layer that is different from a monitoring target aggregation of the monitoring device to the monitoring target aggregation of the monitoring device;

(ii) a higher-rank connection point reachability information updating unit of the N-th layer;
(iii) an inter-connection point reachability information updating unit of the N-th layer; and
(iv) an upper-layer notification unit of the N-th layer, wherein the higher-rank connection point reachability information updating unit of the N-th layer, when a change occurs in a connection status between connection point network devices representing network devices connecting the aggregations of the (N−1)-th layer, which are elements of monitoring target aggregations of the N-th layer, updates the higher-rank connection point reachability information database of the N-th layer such that the higher-rank connection point of the N-th layer of a user connection point whose higher-rank connection point of the (N−1)-th layer is one of the connection point network devices having changed reachability for the higher-rank connection point of the N-th layer in accordance with the change in the connection status is updated to
a) "none" in a case in which reachability between the higher-rank connection point of the (N−1)-th layer and the higher-rank connection point of the N-th layer is "present",
b) "none" in a case in which the reachability between the higher-rank connection point of the (N−1)-th layer and the higher-rank connection point of the N-th layer is "absent",
c) "none" in a case in which a value of the higher-rank connection point of the (N−1)-th layer changes to "none", or
d) the higher-rank connection point of the N-th layer that can be reached from the one of the connection point network devices, in a case in which a value of the higher-rank connection point of the (N−1)-th layer changes from "none" to the connection point network device becoming the higher-rank connection point of the (N−1)-th layer,
the inter-connection point reachability information updating unit of the N-th layer updates the inter-connection point reachability information database of the N-th layer, when a change in a connection status between the connection point network devices occurs, such that the reachability between a pair of user connection points whose higher-rank connection points of the (N−1)-th layer are the connection point network devices having changed reachability in accordance with the change in the connection status between connection point network devices is updated in accordance with the change in the connection status between the connection point network devices,
the inter-connection point reachability information updating unit of the N-th layer, when a change occurs in the reachability between one of the connection point network devices and one of the higher-rank connection points of the (N−1)-th layer corresponding to the user connection point, updates the reachability between a pair of user connection points comprising the user connection point corresponding to the higher-rank connection points of the (N−1)-th layer having the change in accordance with the reachability between the higher-rank connection points of the (N−1)-th layers of the pair of user connection points or the reachability between each of the higher-rank connection points of the (N−1)-th layers of the pair of user connection points and each of the pair of user connection points, and
the upper-layer notification unit of the N-th layer, when the N-th layer is a layer lower than an uppermost layer, transmits updated information of the higher-rank connection point reachability information database of the N-th layer to a monitoring device of an upper layer with respect to the N-th layer.

3. The monitoring device according to claim 2, wherein the higher-rank connection point reachability information updating unit of the N-th layer and the inter-connection point reachability information updating unit of the N-th layer detect that the connection status between the connection point network devices has been changed by receiving a notification of a change in an operation status of an interface to which a link connecting the connection point network devices is connected from the connection point network device.

4. The monitoring device according to claim 2, wherein, in a case in which the monitoring target of the N-th layer that is an upper layer with respect to the first layer has a plurality of higher-rank connection points of the N-th layer, the higher-rank connection point reachability information database of the N-th layer stores the plurality of higher-rank connection points of the N-th layer that can be reached from the user connection point, and the upper-layer notification unit of the N-th layer transmits updated information of the higher-rank connection point reachability information database of the N-th layer comprising the plurality of higher-rank connection points of the N-th layer to a monitoring device of an upper layer with respect to the N-th layer.

5. A monitoring device operable to make up a part of a network fault monitoring system operable to monitor reachability between a user connection point and another user connection point of a plurality of user connection points in a virtual network built on a network having layers made up with aggregations of network devices, the user connection point representing connection points between the virtual network and a user side and being in the network devices, wherein
in a case in which a plurality of monitoring devices constitute a layer corresponding to a monitoring target layer of the aggregations of the network devices, and among the plurality of monitoring devices monitoring the aggregations of the network devices, the monitoring device belongs to a first layer that is a lowermost layer among a plurality of layers of the plurality of monitoring devices, the monitoring device comprises:
(i) a storage unit, implementing one or more processors, configured to store:
a higher-rank connection point reachability information database of the first layer storing the user connection point and a higher-rank connection point of the first layer in association with each other;
an inter-connection point reachability information database of the first layer storing a pair of user connection points comprised in monitoring target network devices of the monitoring device belonging to the first layer and reachability of the pair of user connection points in association with each other, the higher-rank connection point of the first layer representing a network device that can be reached from the user connection point and being comprised in a monitoring target aggregation of the first layer;
(ii) a higher-rank connection point reachability information updating unit of the first layer;
(iii) an inter-connection point reachability information updating unit of the first layer; and
(iv) an upper-layer notification unit of the first layer,
wherein:
the higher-rank connection point reachability information updating unit of the N-th layer, when a change occurs in an operation status of an interface of the network device corresponding to the user connection point, updates the higher-rank connection point reachability information database of the first layer such that the higher-rank connection point of the first layer of the user connection point is updated to:
a) the network device comprised in the monitoring target aggregation of the first layer in a case in which the operation status is "activated", or b) "none" in a case in which the operation status is "deactivated", the inter-connection point reachability information updating unit of the first layer updates the inter-connection point reachability information database of the first layer, when a change occurs in an operation status of the interface of the network device corresponding to the user connection point, such that the reachability between a pair of user connection points comprising the user connection point is updated to:
a) "present" in a case in which an interface corresponding to both of the pair of user connection points is "activated", or
b) "absent" in a case in which the interface corresponding to both of the pair of user connection points is "deactivated", and
    the upper-layer notification unit of the first layer transmits updated information of the higher-rank connection point reachability information database of the first layer to a monitoring device of an upper layer, wherein the storage unit configured to further store:

a higher-rank connection point reachability information database of an N-th layer storing (N+1) items in association with each other; and an inter-connection point reachability information database of the N-th layer storing a pair of user connection points of which higher-rank connection points of an (N−1)-th layer are different in the higher-rank connection point reachability information database of the N-th layer and reachability of the pair of user connection points in association with each other, the (N+1) items comprising the user connection point and higher-rank connection points from a higher-rank connection point of the first layer to a higher-rank connection point of the N-th layer, the higher-rank connection point of the first layer representing a network device that can be reached from the user connection point and being comprised in a monitoring target aggregation of the first layer, the higher-rank connection point of the N-th layer representing a network device that can be reached from the user connection point and connecting a monitoring target aggregation of the N-th layer different from a monitoring target aggregation of the monitoring device to the monitoring target aggregation of the monitoring device;

wherein the monitoring device further comprises:

a higher-rank connection point reachability information updating unit of the N-th layer;

an inter-connection point reachability information updating unit of the N-th layer; and an upper-layer notification unit of the N-th layer, and wherein:

the higher-rank connection point reachability information updating unit of the N-th layer, when a change occurs in a connection status between connection point network devices representing network devices connecting the aggregations of the (N−1)-th layer, which are elements of monitoring target aggregations of the N-th layer, updates the higher-rank connection point reachability information database of the N-th layer such that the higher-rank connection point of the N-th layer of a user connection point whose higher-rank connection point of the (N−1)-th layer is one of the connection point network devices having changed reachability for the higher-rank connection point of the N-th layer in accordance with the change in the connection status is updated to:
a) "none" in a case in which reachability between the higher-rank connection point of the (N−1)-th layer and the higher-rank connection point of the N-th layer is "present",
b) "none" in a case in which the reachability between the higher-rank connection point of the (N−1)-th layer and the higher-rank connection point of the N-th layer is "absent",
c) "none" in a case in which a value of the higher-rank connection point of the (N−1)-th layer changes to "none", or
d) the higher-rank connection point of the N-th layer that can be reached from the one of the connection point network devices, in a case in which a value of the higher-rank connection point of the (N−1)-th layer changes from "none" to the connection point network device becoming the higher-rank connection point of the (N−1)-th layer, the inter-connection point reachability information updating unit of the N-th layer updates the inter-connection point reachability information database of the N-th layer, when a change in a connection status between the connection point network devices occurs, such that the reachability between a pair of user connection points whose higher-rank connection points of the (N−1)-th layer are the connection point network devices having changed reachability in accordance with the change in the connection status between connection point network devices is updated in accordance with the change in the connection status between the connection point network devices, the inter-connection point reachability information updating unit of the N-th layer, when a change occurs in the reachability between one of the connection point network devices and one of the higher-rank connection points of the (N−1)-th layer corresponding to the user connection point, updates the reachability between a pair of user connection points comprising the user connection point corresponding to the higher-rank connection points of the (N−1)-th layer having the change in accordance with the reachability between the higher-rank connection points of the (N−1)-th layers of the pair of user connection points or the reachability between each of the higher-rank connection points of the (N−1)-th layers of the pair of user connection points and each of the pair of user connection points, and the upper-layer notification unit of the N-th layer, when the N-th layer is a layer lower than an uppermost layer, transmits updated information of the higher-rank connection point reachability information database of the N-th layer to a monitoring device of an upper layer with respect to the N-th layer.

6. A network fault monitoring system operable to monitor reachability between a user connection point and another user connection point of a plurality of user connection points in a virtual network built on a network having layers made up with aggregations of network devices, the user connection points representing connection points between the virtual network and a user side and being in the network devices, the network fault monitoring system comprising:

a plurality of monitoring devices comprising a layer corresponding to a monitoring target layer of the aggregations of the network devices; and among the plurality of monitoring devices monitoring the aggregations of the network devices:
a monitoring device belonging to a first layer that is a lowermost layer comprising:
(i) a storage unit, implementing one or more processors, configured to store:
a higher-rank connection point reachability information database of an N-th layer storing (N+1) items in association with each other; and
an inter-connection point reachability information database of the N-th layer storing a pair of user connection points of which higher-rank connection points of an (N−1)-th layer are different in the higher-rank connection point reachability information database of the N-th layer and reachability of the pair of user connection points in association with each other,
wherein
the (N+1) items comprising the user connection point and higher-rank connection points from a higher-rank connection point of the first layer to a higher-rank connection point of the N-th layer,
the higher-rank connection point of the first layer representing a network device that can be reached from the user connection point and being comprised in a monitoring target aggregation of the first layer, and
the higher-rank connection point of the N-th layer representing a network device that can be reached from the user connection point and connecting a monitoring target aggregation of the N-th layer different from a monitoring target aggregation of the monitoring device to the monitoring target aggregation of the monitoring device;
(ii) a higher-rank connection point reachability information updating unit of the N-th layer;
(iii) an inter-connection point reachability information updating unit of the N-th layer; and
(iv) an upper-layer notification unit of the N-th layer, wherein
the higher-rank connection point reachability information updating unit of the N-th layer, when a change occurs in a connection status between connection point network devices representing network devices connecting the aggregations of the (N−1)-th layer, which are elements of monitoring target aggregations of the N-th layer, updates the higher-rank connection point reachability information database of the N-th layer such that the higher-rank connection point of the N-th layer of a user connection point whose higher-rank connection point of the (N−1)-th layer is one of the connection point network devices having changed reachability for the higher-rank connection point of the N-th layer in accordance with the change in the connection status is updated to
a) "none" in a case in which reachability between the higher-rank connection point of the (N−1)-th layer and the higher-rank connection point of the N-th layer is "present",
b) "none" in a case in which the reachability between the higher-rank connection point of the (N−1)-th layer and the higher-rank connection point of the N-th layer is "absent",
c) "none" in a case in which a value of the higher-rank connection point of the (N−1)-th layer changes to "none", or
d) the higher-rank connection point of the N-th layer that can be reached from the one of the connection point network devices, in a case in which a value of the higher-rank connection point of the (N−1)-th layer changes from "none" to the connection point network device becoming the higher-rank connection point of the (N−1)-th layer,
the inter-connection point reachability information updating unit of the N-th layer updates the inter-connection point reachability information database of the N-th layer, when a change in a connection status between the connection point network devices occurs, such that the reachability between a pair of user connection points whose higher-rank connection points of the (N−1)-th layer are the connection point network devices having changed reachability in accordance with the change in the connection status between connection point network devices is updated in accordance with the change in the connection status between the connection point network devices,
the inter-connection point reachability information updating unit of the N-th layer, when a change occurs in the reachability between one of the connection point network devices and one of the higher-rank connection points of the (N−1)-th layer corresponding to the user connection point, updates the reachability between a pair of user connection points comprising the user connection point corresponding to the higher-rank connection points of the (N−1)-th layer having the change in accordance with the reachability between the higher-rank connection points of the (N−1)-th layers of the pair of user connection points or the reachability between each of the higher-rank connection points of the (N−1)-th layers of the pair of user connection points and each of the pair of user connection points, and
the upper-layer notification unit of the N-th layer, when the N-th layer is a layer lower than an uppermost layer, transmits updated information of the higher-rank connection point reachability information database of the N-th layer to a monitoring device of an upper layer with respect to the N-th layer.

7. The network fault monitoring system according to claim 6, wherein the higher-rank connection point reachability information updating unit of the N-th layer and the inter-connection point reachability information updating unit of the N-th layer detect that the connection status between the connection point network devices has been changed by receiving a notification of a change in an operation status of an interface to which a link connecting the connection point network devices is connected from the connection point network device.

8. The network fault monitoring system according to claim 6, wherein, in a case in which the monitoring target of the N-th layer that is an upper layer with respect to the first layer has a plurality of higher-rank connection points of the N-th layer, the higher-rank connection point reachability information database of the N-th layer stores the plurality of higher-rank connection points of the N-th layer that can be reached from the user connection point, and the upper-layer notification unit of the N-th layer transmits updated information of the higher-rank connection point reachability information database of the N-th layer comprising the plurality of higher-rank connection points of the N-th layer to a monitoring device of an upper layer with respect to the N-th layer.

* * * * *